US008201980B2

(12) United States Patent
Ookubo et al.

(10) Patent No.: US 8,201,980 B2
(45) **Date of Patent: *Jun. 19, 2012**

(54) VEHICLE HEADLAMP

(75) Inventors: Yasuhiro Ookubo, Isehara (JP); Toshiya Abe, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 260 days.

This patent is subject to a terminal disclaimer.

(21) Appl. No.: 12/603,317

(22) Filed: Oct. 21, 2009

(65) Prior Publication Data

US 2010/0110711 A1 May 6, 2010

(30) Foreign Application Priority Data

Oct. 30, 2008 (JP) ................................ 2008-280070

(51) Int. Cl.
*F21V 7/06* (2006.01)
*B60Q 1/04* (2006.01)

(52) U.S. Cl. ......................... 362/517; 362/283; 362/346

(58) Field of Classification Search .................. 362/513, 362/514, 517, 465, 281, 283, 346
See application file for complete search history.

(56) References Cited

U.S. PATENT DOCUMENTS

| | | | | |
|---|---|---|---|---|
| RE15,088 | E | 4/1921 | Schroeder | |
| 4,831,506 | A | 5/1989 | Miyazawa | |
| 5,060,120 | A * | 10/1991 | Kobayashi et al. | 362/465 |
| 5,086,376 | A | 2/1992 | Blusseau | |
| 6,334,702 | B1 * | 1/2002 | Albou | 362/514 |
| 6,457,849 | B2 * | 10/2002 | Tsukamoto | 362/509 |
| 6,626,565 | B2 * | 9/2003 | Ishida | 362/514 |
| 7,108,412 | B2 | 9/2006 | Ishida et al. | |
| 7,311,430 | B2 | 12/2007 | Tsukamoto et al. | |
| 7,682,038 | B2 * | 3/2010 | Wood | 362/187 |
| 2004/0252517 | A1 | 12/2004 | Ishida et al. | |
| 2007/0086202 | A1 | 4/2007 | Tsukamoto et al. | |
| 2008/0089085 | A1 * | 4/2008 | Popelek | 362/514 |

FOREIGN PATENT DOCUMENTS

| | | | |
|---|---|---|---|
| DE | 38 26 988 | A1 | 2/1990 |
| DE | 10 2004 012 184 | A1 | 12/2004 |
| EP | 0 373 065 | B1 | 6/1990 |
| EP | 1 225 387 | B1 | 7/2002 |
| FR | 2 808 867 | A1 | 11/2001 |
| JP | 2007-109493 | A | 4/2007 |

OTHER PUBLICATIONS

U.S. Appl. No. 12/603,312, filed Oct. 21, 2009, Ookubo.

Y. Okubo, U.S. PTO Office Action, U.S. Appl. No. 12/648,915, dated Feb. 22, 2012, 12 pages.

Y. Okubo, U.S. PTO Notice of Allowance, U.S. Appl. No. 12/648,915, dated Apr. 27, 2012, 9 pages.

* cited by examiner

*Primary Examiner* — Peggy A. Neils
(74) *Attorney, Agent, or Firm* — Foley & Lardner LLP

(57) ABSTRACT

A vehicle headlamp is provided with: a fixed reflector having reflecting surfaces, a respective one of which is made of a parabola-based free curved face; movable reflectors having reflecting surfaces, a respective one of which is made of a parabola-based free curved face; and semiconductor-type light sources, a respective one of which has a light emitting chip shaped like a planar rectangle. When the movable reflectors are positioned in a first location, a light distribution pattern for low beam is obtained on the reflecting surfaces of the fixed reflector. When the movable reflectors are positioned in a second location, light distribution patterns for high beams are obtained on the reflecting surfaces of the fixed reflector and the movable reflector. As a result, the vehicle headlamp enables downsizing, weight reduction, power saving, and cost reduction.

17 Claims, 15 Drawing Sheets

VEHICLE HEADLAMP

CROSS-REFERENCE TO RELATED APPLICATIONS

This application claims priority of Japanese Patent Application No. 2008-280070 filed on Oct. 30, 2008. The contents of this application are incorporated herein by reference in their entirety.

BACKGROUND OF THE INVENTION

1. Field of the Invention

The present invention relates to a vehicle headlamp for illuminating light to a forward direction of a vehicle by changing a light distribution pattern for low beam (light distribution pattern for passing) and a light distribution pattern for high beam (light distribution pattern for cruising).

2. Description of the Related Art

A vehicle headlamp of this type is conventionally known (Patent Document 1: Japanese Laid-open Patent Application No 2007-109493, for example). Hereinafter, a conventional vehicle headlamp will be described. The conventional vehicle headlamp is made up of: a first light source unit forming a light distribution pattern for low beam; and a second light source unit forming a light distribution pattern for high beam. The first light source unit is a projector-type lamp unit, and is provided with: a light source; an elliptical (convergent) reflector; a shade; and a projecting lens. In addition, the second light source unit is a projector-type lamp unit, and is provided with: a light source; an elliptical (convergent) reflector; and a projecting lens. Hereinafter, functions of the conventional headlamp will be described. When the light source of the first light source unit is lit, the light from the light source is reflected by means of the reflector; a part of the reflected light is cut off by means of the shade; a light distribution pattern having an oblique cutoff line and a horizontal cutoff line, i.e., a light distribution pattern for low beam is formed; and the light distribution pattern for low beam is longitudinally and transversely inverted from the projecting lens, and illuminated (projected) to a forward direction of a vehicle. In addition, when the light source of the second light source unit is lit, the light from the light source is reflected by means of the reflector, and the reflected light, as a light distribution pattern for high beam, is longitudinally and transversely inverted from the projecting lens, and is illuminated (projected) toward the forward direction of the vehicle.

Again, the conventional vehicle headlamp is made of: the first light source unit having the light source, the reflector, a shade, and the projector lens; and the second light source unit having the light source, the reflector, and the projector lens. Thus, the conventional vehicle headlamp requires a large number of components and the second light source unit for a light distribution pattern for high beam, and entails problems concerning downsizing, weight reduction, power saving, and cost reduction, accordingly.

The present invention has been made to solve problems concerning downsizing, weight reduction, power saving, and cost reduction, which could arise due to the fact that the conventional vehicle headlamp requires the second light source unit for a light distribution pattern for high beam.

SUMMARY OF THE INVENTION

A first aspect of the present invention is directed to a vehicle headlamp for illuminating light toward a forward direction of a vehicle by changing a light distribution pattern for low beam and a light distribution pattern for high beam, said vehicle headlamp comprising:

a fixed reflector having a reflecting surface made of a parabola-based free curved face;

a movable reflector having a reflecting surface made of a parabola-based free curved face;

a semiconductor-type light source having a light emitting chip;

a holder on which the movable reflector is rotatably mounted around a horizontal axis passing through a center of the light emitting chip and vicinity thereof; and a drive unit for rotating the movable reflector around the horizontal axis between a first location and a second location, wherein:

a reference focal point of the reflecting surface of the fixed reflector and a reference focal point of the reflecting surface of the movable reflector are coincident or substantially coincident with each other and are positioned at or near the center of the light emitting chip;

a reference light axis of the reflecting surface of the fixed reflector and a reference light axis of the reflecting surface of the movable reflector are coincident or substantially coincident with each other and are orthogonal to the horizontal axis, and further, pass through the center of the light emitting chip or vicinity thereof;

an area of the reflecting surface of the fixed reflector is greater than an area of the reflecting surface of the movable reflector;

a reference focal-point distance of the reflecting surface of the fixed reflector is greater than a reference focal-point distance of the reflecting surface of the movable reflector;

the reflecting surface of the fixed reflector is comprised of a reflecting surface for low beam, forming the light distribution pattern for low beam, and a reflecting surface for high beam, forming the light distribution pattern for high beam;

the reflecting surface of the movable reflector is comprised of a reflecting surface for high beam, forming the light distribution pattern for high beam;

when the movable reflector is positioned in the first location, light radiated from the light emitting chip onto the reflecting surface for high beam, of the fixed reflector, or alternatively, reflection light reflected on the reflecting surface for high beam, of the fixed reflector, is shaded by means of the movable reflector, and reflection light reflected on the reflecting surface for low beam, of the fixed reflector, is illuminated toward the forward direction of the vehicle, as the light distribution pattern for low beam; and when the movable reflector is positioned in the second location, reflection light reflected on the reflecting surface for high beam, of the movable reflector, reflection light reflected on the reflecting surface for high beam, of the fixed reflector, and reflection light reflected on the reflecting surface for low beam, of the fixed reflector, are illuminated toward the forward direction of the vehicle, as the light distribution patterns for high beams, respectively.

A second aspect of the present invention is directed to the vehicle headlamp according to the first aspect, wherein:

the light distribution pattern for low beam is a light distribution pattern having an oblique cutoff line on a cruising lane side and a horizontal cutoff line on an opposite lane side, with an elbow point serving as a boundary;

the light emitting chip is shaped like a planar rectangle;

a light emitting face of the light emitting chip is turned to a vertical axis direction being orthogonal to the reference light axis and the horizontal axis;

a long side of the light emitting chip is parallel to the horizontal axis;

the reflecting surface for low beam is comprised of: a first reflecting surface and a second reflecting surface at a central part; and a third reflecting surface at an end part, which are divided in a vertical-axis direction;

the first reflecting surface is a reflecting surface made of a free curved face for light-distributing and controlling a reflection image of the light emitting chip, so that: the reflection image of the light emitting chip does not run out of the oblique cutoff line and the horizontal cutoff line; and a part of the reflection image of the light emitting chip is substantially in contact with the oblique cutoff line and the horizontal cutoff line;

the second reflecting surface is a reflecting surface made of a free curved face for light-distributing and controlling a reflection image of the light emitting chip, so that: the reflection image of the light emitting chip does not run out of the oblique cutoff line and the horizontal cutoff line; and a part of the reflection image of the light emitting chip is substantially in contact with the oblique cutoff line and the horizontal cutoff line; and so that: density of a reflection image group of the light emitting chip becomes lower than density of a reflection image group of the light emitting chip according to the first reflecting surface; and the reflection image group of the light emitting chip contains a reflection image group of the light emitting chip according to the first reflecting surface; and the third reflecting surface is a reflecting surface made of a free curved face for light-distributing and controlling a reflection image of the light emitting chip, so that: the reflection image of the light emitting chip is substantially included in the light distribution pattern; density of the reflection image group of the light emitting chip becomes lower than density of the reflection image group of the light emitting chip according to the first reflecting surface and the second reflecting surface; and the reflection image group of the light emitting chip contains a reflection image group of the light emitting chip according to the first reflecting surface and the second reflecting surface.

A third aspect of the present invention is directed to the vehicle headlamp according to the first aspect, wherein:

the fixed reflector is substantially shaped like a rotational parabola face;

a size of an opening of the fixed reflector is about 100 mm or less in diameter and is greater than a size of an opening of the movable reflector when the movable reflector is positioned in the second location;

a reference focal point of the reflecting surface of the fixed reflector is on the reference optical axis and is positioned between a center of the light emitting chip and a long side at a rear side of the light emitting chip;

a reference focal-point distance of the reflecting surface of the fixed reflector is about 10 mm to 18 mm and is greater than a reference focal-point distance of the reflecting surface of the movable reflector; and the first reflecting surface and the second reflecting surface are provided in a range in which a longitudinal angle is within ±40 degrees from a center of the light emitting chip, the range being equivalent to a range in which reflection images are obtained within an angle determined by adding about 5 degrees to a tilt angle of the oblique cutoff line against a screen horizontal line of a reflecting image of the light emitting chip, and in a range of high-energy in the energy distribution of the light emitting chip.

A fourth aspect of the present invention is directed to the vehicle headlamp according to the first aspect, wherein:

the reflecting surface of the fixed reflector, the reflecting surface of the movable reflector, and the semiconductor-type light source are disposed so that an upside unit, a light emitting face of the light emitting chip being oriented upward in a vertical-axis direction, and a downside unit, a light emitting face of the light emitting chip being oriented downward in a vertical-axis direction, are established in a point-symmetrical state.

A fifth aspect of the present invention is directed to a vehicle headlamp, comprising:

(i) a semiconductor-type light source for illuminating light;

(ii) a first reflector made of a parabola-based curved face, the first reflector having a plurality of reflecting surfaces including a first reflecting surface for light distribution pattern and a second reflecting surface for light distribution pattern, for reflecting light radiated from the semiconductor-type light source, as reflection light, so as to illuminate the reflected light toward a forward direction of a vehicle; and (iii) a second reflector which is movable to a predetermined location, the second reflector having the second reflecting surface for light distribution pattern, for interrupting reflection light according to the reflecting surface of the first reflector and changing over light distribution pattern according to the interrupted reflected surface, wherein:

the second reflector is adapted to be movable between:

a first location in which the second reflecting surface for light distribution pattern of the second reflector is disposed in opposite to the second reflecting surface for light distribution pattern of the first reflector; and a second location in which the second reflecting surface for light distribution pattern of the second reflector is disposed in front of the first reflecting surface for light distribution pattern of the first reflector;

when the second reflector is disposed in the first location, reflection light reflected on the second reflecting surface for light distribution pattern of the first reflector is shaded by means of the second reflecting surface for light distribution pattern of the second reflector and reflection light reflected on the first reflecting surface for light distribution pattern of the first reflector is illuminated toward the forward direction of the vehicle, as a first light distribution pattern; and when the second reflector is disposed in the second location, reflection light reflected on the first reflecting surface for light distribution pattern of the first reflector is shaded by means of the second reflecting surface for light distribution pattern, of the second reflector; and a respective one of reflection light beams reflected on the second reflecting surface for light distribution pattern, of the first reflector, and on the second reflecting surface for light distribution pattern, of the second reflector, is illuminated toward the forward direction of the vehicle, as a second light distribution pattern.

A sixth aspect of the present invention is directed to the vehicle headlamp according to the fifth aspect, wherein:

the second reflector has a through hole through which reflection light according to the second reflecting surface for light distribution pattern of the first reflector is passed toward the forward direction of the vehicle in the second location.

A seventh aspect of the present invention is directed to the vehicle headlamp according to the fifth aspect, wherein:

the second reflector has a visor portion which is provided at a peripheral edge of the second reflector so as to interrupt direct light from the semiconductor-type light source in the first location.

An eighth aspect of the present invention is directed to the vehicle headlamp according to the fifth aspect, wherein:

the second reflecting surface for light distribution pattern, of the second reflector, is disposed opposite to a part of the first reflecting surface for light distribution pattern, of the first reflector, in the second location;

when the second reflector is disposed in the second location, a part of reflection light reflected on the first reflecting surface for light distribution pattern, of the first reflector, is shaded by means of the second reflecting surface for light distribution pattern, of the second reflector;

a respective one of reflection light beams reflected on the second reflecting surface for light distribution pattern, of the first reflector, the second reflecting surface for light distribution pattern, of the second reflector, and a part other than said part of the first reflecting surface for light distribution pattern, of the first reflector, is illuminated toward the forward direction of the vehicle, as a second light distribution pattern.

A ninth aspect of the present invention is directed to the vehicle headlamp according to the fifth aspect, further comprising:

a holder for fixing and holding the semiconductor-type light source and the first reflector so that light radiated from a light emitting face of the semiconductor-type light source, as reflection light, is illuminated in a vertical-axis direction by means of the first reflector, the holder rotatably mounting the second reflector between the first location and the second location.

A tenth aspect of the present invention is directed to the vehicle headlamp according to the fifth aspect, wherein:

the first reflecting surface for light distribution pattern, of the first reflector, includes:

a first reflecting surface and a second reflecting surface, which are adjacent to each other at a center of the first reflector, and are arranged in a range of high energy in an energy distribution of the semiconductor-type light source; and a third reflecting surface which is arranged at a respective one of ends of the first reflector so as to sandwich the first reflecting surface and the second reflecting surface therebetween, and are arranged in a range of low energy in an energy distribution of the semiconductor-type light source; and the second reflecting surface for light distribution pattern, of the first reflector, is provided at a part of the first reflecting surface and the second reflecting surface of the first reflecting surface for light distribution pattern, of the first reflector.

An eleventh aspect of the present invention is directed to the vehicle headlamp according to the tenth aspect, wherein:

the first reflecting surface and the second reflecting surface of the first reflecting surface for light distribution pattern, of the first reflector, is provided in a range in which a reflection image of the semiconductor-type light source is obtained within a longitudinal angle of about 40 degrees from a center in a vertical-axis direction of the light emitting face.

A twelfth aspect of the present invention is directed to the vehicle headlamp according to the fifth aspect, wherein:

the first reflecting surface for light distribution pattern, of the first reflector, is a reflecting surface forming reflection light of a low-beam light distribution pattern for passing; and the second reflecting surface for light distribution pattern, of the first reflector and the second reflector, is a reflecting surface forming reflection light of a high-beam light distribution pattern for cruising.

A thirteenth aspect of the present invention is directed to a vehicle headlamp, comprising:

(i) a semiconductor-type light source for illuminating light;

(ii) a first reflector made of a parabola-based curved face, the first reflector having a plurality of reflecting surfaces including a first reflecting surface for light distribution pattern and a second reflecting surface for light distribution pattern, for reflecting light radiated from the semiconductor-type light source, as reflection light, so as to illuminate the reflected light toward a forward direction of a vehicle; and (iii) a second reflector which is movable to a predetermined location, the second reflector having the second reflecting surface for light distribution pattern, for interrupting reflection light according to the reflecting surface of the first reflector, wherein:

the second reflector is adapted to be movable between:

a first location in which the second reflecting surface for light distribution pattern of the second reflector is disposed in opposite to the second reflecting surface for light distribution pattern of the first reflector; and a second location in which the second reflecting surface for light distribution pattern of the second reflector is disposed in front of the first reflecting surface for light distribution pattern of the first reflector;

when the second reflector is disposed in the first location, reflection light reflected on the second reflecting surface for light distribution pattern of the first reflector is shaded by means of the second reflecting surface for light distribution pattern of the second reflector and reflection light reflected on the first reflecting surface for light distribution pattern of the first reflector is illuminated toward the forward direction of the vehicle, as a first light distribution pattern; and when the second reflector is disposed in the second location, a part of reflection light reflected on the first reflecting surface for light distribution pattern of the first reflector is shaded by means of the second reflecting surface for light distribution pattern, of the second reflector; and a respective one of reflection light beams reflected on the second reflecting surface for light distribution pattern, of the first reflector, the second reflecting surface for light distribution pattern, of the second reflector, and a part other than said part of the first reflecting surface for light distribution pattern, of the first reflector, is illuminated toward the forward direction of the vehicle, as a second light distribution pattern.

A fourteenth aspect of the present invention is directed to the vehicle headlamp according to the thirteenth aspect, wherein:

the first reflecting surface and the second reflecting surface of the first reflecting surface for light distribution pattern, of the first reflector, are provided in a range in which a reflection image of the semiconductor-type light source is obtained within a longitudinal angle of ±40 degrees from a center of a vertical-axis direction of the light emitting face of the semiconductor-type light source.

A fifteenth aspect of the present invention is directed to the vehicle headlamp according to the thirteenth aspect, further comprising:

a holder for fixing and holding the semiconductor light source and the first reflector so that: light radiated in a vertical-axis direction from the light emitting face of the semiconductor-type light source is reflected as reflection light by means of the first reflector; and the reflected light is illuminated toward a forward direction of a vehicle, the holder rotatably mounting the second reflector between the first location and the second location.

A sixteenth aspect of the present invention is directed to the vehicle headlamp according to the thirteenth aspect, wherein:

the second reflector has a through hole through which reflection light according to the second reflecting surface for light distribution pattern, of the first reflector, is passed toward the forward direction of the vehicle in the second location.

A seventeenth aspect of the present invention is directed to the vehicle headlamp according to the thirteenth aspect, wherein:

the second reflector has a visor portion provided at a peripheral edge of the second reflector so as to interrupt direct light from the semiconductor-type light source in the first location.

According to the first aspect of the present invention, a vehicle headlamp is characterized by comprising:

a fixed reflector having a reflecting surface made of a curved face;

a movable reflector having a reflecting surface made of a curved face;

a semiconductor-type light source having a light emitting chip;

a holder on which the movable reflector is rotatably mounted around a horizontal axis passing through a center of the light emitting chip and vicinity thereof;

drive unit for rotating the movable reflector around the horizontal axis between a first location and a second location, the reflecting surface of the fixed reflector is comprised of a reflecting surface for low beam, forming the light distribution pattern for low beam, and a reflecting surface for high beam, forming the light distribution pattern for high beam;

the reflecting surface of the movable reflector is comprised of a reflecting surface for high beam, forming the light distribution pattern for high beam;

when the movable reflector is positioned in the first location, light radiated from the light emitting chip onto the reflecting surface for high beam, of the fixed reflector, or reflection light reflected on the reflecting surface for high beam, of the fixed reflector, are shaded by means of the movable reflector, and reflection light reflected on the reflecting surface for low beam, of the fixed reflector, is illuminated toward the forward direction of the vehicle, as the light distribution pattern for low beam; and when the movable reflector is positioned in the second location, reflection light reflected on the reflecting surface for high beam, of the movable reflector, reflection light reflected on the reflecting surface for high beam, of the fixed reflector, and reflection light reflected on the reflecting surface for low beam, of the fixed reflector, are illuminated toward the forward direction of the vehicle, respectively, as the light distribution patterns for high beams.

According to the second aspect of present invention, the vehicle headlamp is characterized in that:

the light distribution pattern for low beam is a light distribution pattern having an oblique cutoff line on a cruising lane side and a horizontal cutoff line on an opposite lane side, with an elbow point serving as a boundary;

the reflecting surface of the fixed reflector and the reflecting surface of the movable reflector are made of a parabola-based free curved face;

the light emitting chip of the semiconductor-type light source is shaped like a planar rectangle;

a center of the light emitting chip is positioned at the reference focal-points of the reflecting surface of the fixed reflector and the reflecting surface of the movable reflector or vicinity thereof and is positioned at the reference light axis of the reflecting surface of the fixed reflector and the reflecting surface of the movable reflector;

the light emitting face of the light emitting chip is turned to a vertical axis direction;

a long side of the light emitting chip is parallel to the horizontal axis being orthogonal to the reference light axis and the vertical axis;;

the reflecting surface for low beam is comprised of: a first reflecting surface and a second reflecting surface at a central part; and a third reflecting surface at an end part, which are divided in a vertical-axis direction;

the first reflecting surface is a reflecting surface made of a free curved face for light-distributing and controlling a reflection image of the light emitting chip, so that: the reflection image of the light emitting chip does not run out of the oblique cutoff line and the horizontal cutoff line; and a part of the reflection image of the light emitting chip is substantially in contact with the oblique cutoff line and the horizontal cutoff line;

the second reflecting surface is a reflecting surface made of a free curved face for light-distributing and controlling a reflection image of the light emitting chip, so that: the reflection image of the light emitting chip does not run out of the oblique cutoff line and the horizontal cutoff line; and a part of the reflection image of the light emitting chip is substantially in contact with the oblique cutoff line and the horizontal cutoff line; and so that: density of a reflection image group of the light emitting chip becomes lower than density of a reflection image group of the light emitting chip according to the first reflecting surface; and the reflection image group of the light emitting chip contains a reflection image group of the light emitting chip according to the first reflecting surface; and the third reflecting surface is a reflecting surface made of a free curved face for light-distributing and controlling a reflection image of the light emitting chip, so that: the reflection image of the light emitting chip is substantially included in the light distribution pattern; density of the reflection image group of the light emitting chip becomes lower than density of the reflection image group of the light emitting chip according to the first reflecting surface and the second reflecting surface; and the reflection image group of the light emitting chip contains a reflection image group of the light emitting chip according to the first reflecting surface and the second reflecting surface.

Further, according to the third aspect of the present invention, the vehicle headlamp is characterized in that:

the fixed reflector is substantially shaped like a rotational parabola face;

a size of an opening of the fixed reflector is about 100 mm or less in diameter and is greater than a size of an opening of the movable reflector when the movable reflector is positioned in the second location;

a reference focal point of the reflecting surface of the fixed reflector is on the reference optical axis and is positioned between a center of the light emitting chip and a long side at a rear side of the light emitting chip;

a reference focal-point distance of the reflecting surface of the fixed reflector is about 10 mm to 18 mm and is greater than a reference focal-point distance of the reflecting surface of the movable reflector; and the first reflecting surface and the second reflecting surfaces are provided in a range in which a longitudinal angle is within ±40 degrees from a center of the light emitting chip, the range being equivalent to a range in which reflection images are obtained within an angle determined by adding about 5 degrees to a tilt angle of the oblique cutoff line against a screen horizontal line of a reflecting image of the light emitting chip, and in a range of high-energy in the energy distribution of the light emitting chip.

Furthermore, according to the fourth aspect of the present invention, the vehicle headlamp is characterized in that:

the reflecting surface of the fixed reflector, the reflecting surface of the movable reflector, and the semiconductor-type light source are disposed so that an upside unit, a light emitting face of the light emitting chip being oriented upward in a vertical-axis direction, and a downside unit, a light emitting face of the light emitting chip being oriented downward in a vertical-axis direction, are established in a point-symmetrical state.

The vehicle headlamp according to the first aspect of the present invention is further characterized in that, by a means for solving the problem described previously, when a movable reflector is positioned in a first location, if a light emitting chip of a semiconductor-type light source is lit to emit light, the light radiated from the light emitting chip is reflected on a reflecting surface for low beam, of a fixed reflector; and the reflected light is illuminated toward a forward direction of a vehicle, as a light distribution pattern for low beam. In addition, when a movable reflector is positioned in a second location, if a light emitting chip of a semiconductor-type light source is lit to emit light, light radiated from the light emitting chip is reflected on a reflecting surface for high beam, of the movable reflector, a reflecting surface for high beam, of the fixed reflector, and a reflecting surface for low beam, respectively, and the reflected light is illuminated toward the forward direction of the vehicle, respectively, as a light distribution pattern for high beam.

Moreover, the vehicle headlamp according to the first aspect of the present invention is made of a fixed reflector, a movable reflector, a semiconductor-type light source, and a drive unit. Thus, in comparison with the conventional vehicle headlamp, the number of components is reduced without a need to provide a second light source unit for a light distribution pattern for high beam, and downsizing, weight reduction, power saving, and cost reduction can be achieved, accordingly.

In addition, the vehicle headlamp according to the second embodiment of the present invention is further characterized in that, by a means for solving the problem described previously, when a movable reflector is positioned in a first location, if a light emitting chip of a semiconductor-type light source is lit to emit light, the light radiated from the light emitting chip is reflected on a reflecting surface for low beam, of a fixed reflector; and with en elbow point serving as a boundary, a light distribution pattern for low beam having an oblique cutoff line on a cruising lane side and a horizontal cutoff line on an opposite lane side is illuminated toward a forward direction of a vehicle. In other word, a reflection image of a light emitting chip, which is reflected on a first reflecting surface, is illuminated toward the forward direction of the vehicle, so that: the reflected light does not run out of the oblique cutoff line and the horizontal cutoff line; and a part of the reflection image of the light emitting chip is substantially in contact with the oblique cutoff line and the horizontal cutoff line. In addition, a reflection image of a light emitting chip, reflected on a second reflecting surface, is illuminated toward the forward direction of the vehicle, so that: the reflection image does not run out of the oblique cutoff line and the horizontal cutoff line; a part of the reflection image of the light emitting chip is substantially in contact with the oblique cutoff line and the horizontal cutoff line, similarly, and so that: density of a reflection image group of the light emitting chip becomes lower than that of a reflection image group of the light emitting chip according to the first reflecting surface. Further, a reflection image of a light emitting chip, which is reflected on a third reflecting surface, is illuminated toward the forward direction of the vehicle, so that: the reflected image is substantially included in a light distribution pattern for low beam; and density of a reflection image group of a light emitting chip becomes lower than that of reflection image group of the light emitting chips according to the first and second reflecting surfaces. In this manner, in the vehicle headlamp according to the second aspect of the present invention, by means of the first reflecting surface, a high luminous intensity zone is light-distributed and controlled near the oblique cutoff line of the cruising lane side of the light distribution pattern for low beam and the horizontal cutoff line at the opposite lane side, so that long-distance visibility is improved and no stray light is imparted to an oncoming vehicle or pedestrian and the like, making it possible to contribute to traffic safety as the result thereof. Moreover, in the vehicle headlamp according to the second aspect of the present invention, a middle luminous intensity zone which is light-distributed and controlled on the second reflecting surface encompasses a high luminous intensity zone near the oblique cutoff line at the cruising lane side of the light distribution pattern for low beam, light-distributed and controlled on the first reflecting surface, and the horizontal cutoff line at the opposite lane side, so that: the high luminous intensity zone near the oblique cutoff line at the cruising lane side of the light distribution pattern for low beam, light-distributed and controlled on the first reflecting surface, and the horizontal cutoff line at the opposite lane side is connected to a low luminous intensity zone of the entire light distribution pattern for low beam, light distributed and controlled on the third reflecting surface, in a middle luminous intensity zone near the oblique cutoff line at the cruising lane side of the light distribution pattern for low beam, light-distributed and controlled on the second reflecting surface, and the horizontal cutoff line at the opposite lane side, and a smooth change in luminous intensity is obtained. As a result, the vehicle headlamp according to the second aspect of the present invention become capable of light-distributing and controlling a light distribution pattern for low beam, having an oblique cutoff line and a horizontal cutoff line, the pattern being optimal for vehicle use.

Moreover, the vehicle headlamp according to the second aspect of the present invention is characterized in that a relationship between the numbers of constituent light sources and optical elements is obtained as that of one pair of semiconductor-type light sources and one pair of optical elements, i.e., a fixed reflector and a movable reflector (1:1). As a result, the vehicle headlamp according to the second aspect of the present invention becomes capable of eliminating an error of a combination of distortions at the optical element side and improving precision of assembling the reflectors at the optical element side, in comparison with the conventional vehicle headlamp in which a relationship between the numbers of constituent light sources and optical elements is obtained as that one light source and three optical elements, i.e., a reflector, shade, and a projection lens (1:3) and that of one light source two optical elements, i.e., a reflector and a projection lens (1:2).

Further, the vehicle headlamp according to the third aspect of the present invention becomes capable of reliably performing both light-distributing and controlling of a light distribution pattern for low beam, which is optimal for vehicle use, and downsizing of a lamp unit, by a means for solving the problem described previously.

Furthermore, the vehicle headlamp according to the fourth aspect of the present invention is characterized in that the reflecting surface of the fixed reflector, the reflecting surface of the movable reflector, and the semiconductor-type light source are disposed so that an upside unit, a light emitting face of the light emitting chip being oriented upward in a vertical-axis direction, and a downside unit, a light emitting face of the light emitting chip being oriented downward in a vertical-axis direction, are established in a point-symmetrical state. As a result, even if at least one of the reflectors is downsized, luminous intensity of a respective one of a light distribution pattern for low beam and a light distribution pattern for high beam is sufficiently obtained, so that the vehicle headlamp according to the fourth aspect of the present invention becomes capable of further reliably performing both light-distributing and controlling of a light distribution pattern for low beam and a light distribution pattern for high beam, which are optimal for vehicle use, and downsizing of a lamp unit.

DETAILED DESCRIPTION OF THE EMBODIMENTS

Figure 9:
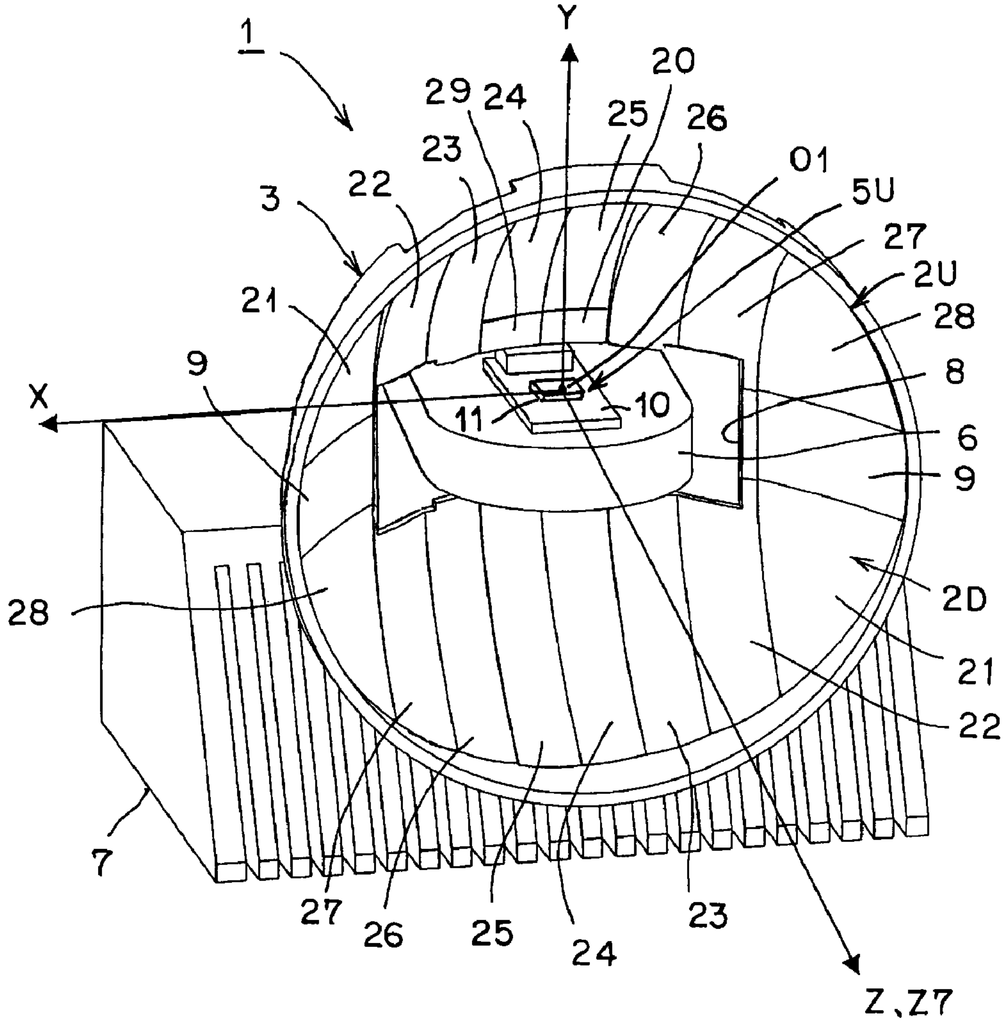
FIG. 9 is a perspective view showing essential parts without the upside movable reflector, the downside movable reflector, and a drive unit, similarly.
Figure 18:
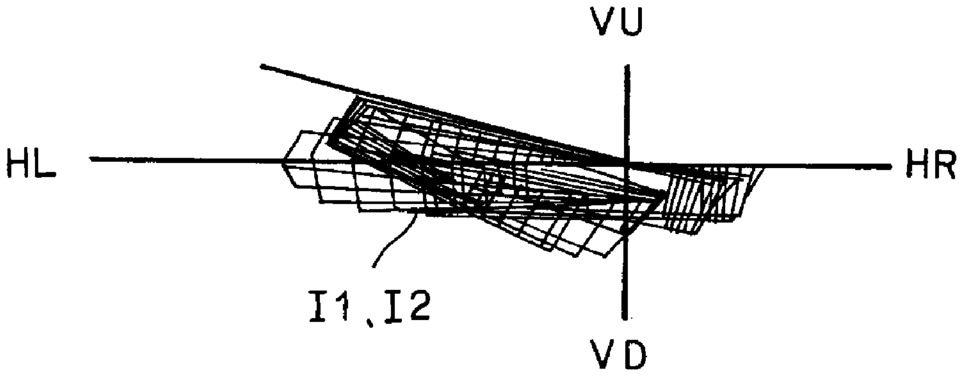
FIG. 18 is an explanatory view showing a reflection image group of a light emitting chip, the reflection image group being obtained on the first reflecting surface made of the fourth segment, similarly.
Figure 19:
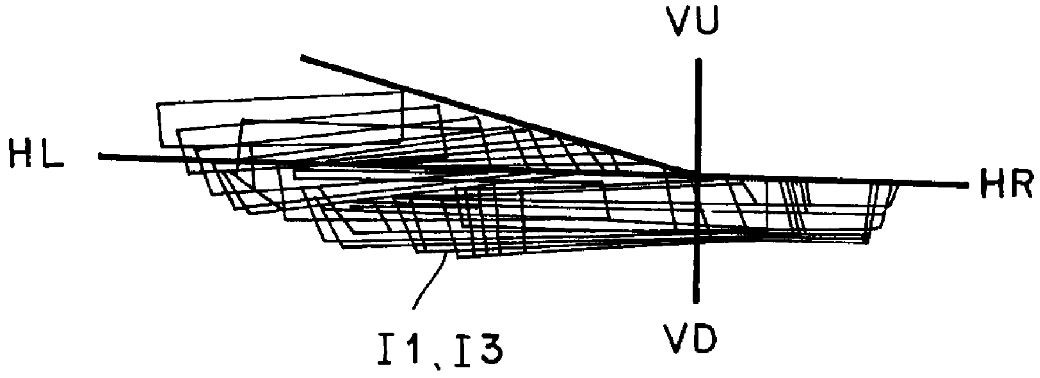
FIG. 19 is an explanatory view showing a reflection image group of a light emitting chip, the reflection image group being obtained on the second reflecting surface made of the fifth segment, similarly.

Hereinafter, embodiments of a vehicle headlamp according to the present invention will be described in detail, referring to the drawings. In the drawings, the letter sign "VU-VD" designates a vertical line of a top and a bottom of a screen; and the letter sign "HL-HR" designates a horizontal line of a left and a right of the screen. FIGS. 18 and 19 are explanatory views showing a reflection image group of a light emitting chip on the screen obtained by computer simulation. In the specification and claims, the terms "top", "bottom", "front", "rear", "left", and "right" designate the top, bottom, front, rear, left, and right of a vehicle when the vehicle headlamp according to the present invention is mounted on a vehicle (automobile). In addition, in FIGS. 9, 10, and 11, in order to clarify a structure of the invention, an upside movable reflector 13U, a downside movable reflector 13D, and a drive unit 14 are not shown. Further, in FIGS. 1, 2, 3, and 4, a fin shape of a heat sink 7 is not shown.

Embodiment(s)

Hereinafter, a configuration of a vehicle headlamp in the embodiment will be described. In the figures, reference numeral 1 denotes a vehicle headlamp (automobile headlamp) in the embodiment. The vehicle headlamp 1 illuminates light toward a forward direction of a vehicle by changing: a light distribution pattern for passing (light distribution pattern for low beam), shown in FIG. 20, i.e., a light distribution pattern LP for low beam, having an oblique cutoff line CL1 on a cruising lane side (left side) and a horizontal cutoff line CL2 on an opposite lane side (right side) with an elbow point E being a boundary; and a light distribution pattern for cruising (light distribution pattern for high beam), shown in FIG. 21, i.e., a first light distribution pattern HP1 for high beam, a second light distribution pattern HP2 for high beam, a third light distribution pattern HP3 for high beam, and a light distribution pattern LP1 for dimming low beam. An angle formed between the oblique cutoff line CL1 and a horizontal line HL-HR of a screen is about 15 degrees.

The vehicle headlamp 1 is made up of: a fixed reflector 3 having an upside reflecting surface 2U and a downside reflecting surface 2D made of a parabola-based free curved face (NURBS-curved face); upside and downside movable reflectors 13U and 13D having upside and downside reflecting surfaces 12U and 12D made of a parabola-based free curved face (NURBS-curved face), similarly; an upside semiconductor-type light source 5U and a downside semiconductor-type light source 5D having a light emitting chip of a planar rectangle shape (planar elongated shape); a holder 6; a heat sink member 7; a drive unit 14; and a lamp housing and a lamp lens (such as a transparent outer lens, for example), although not shown.

The holder 6 is shaped like a plate having a top fixing face and a bottom fixing face. The holder 6 is made up of a resin member or a metal member with high thermal conductivity, for example. The heat sink member 7 is formed in a trapezoidal shape having an upper fixing face at its upper part, and is shaped like a fin from an intermediate part to a lower part. The heat sink member 7 is made up of a resin member or a metal member with high thermal conductivity, for example.

The fixed reflector 3, the upside movable reflector 13U, the downside movable reflector 13D, the upside semiconductor-type light source 5U, the downside semiconductor-type light source 5D, the holder 6, the heat sink member 7, and the drive unit 14 constitute a lamp unit. In other words, the fixed reflector 3 is fixed and held on the holder 6. The upside movable reflector 13U and the downside movable reflector 13D are rotatably mounted on the holder 6 around a horizontal axis X. The upside semiconductor-type light source 5U is fixed and held on the top fixing face of the holder 6. The downside semiconductor-type light source 5D is fixed and held on the bottom fixing face of the holder 6. The holder 6 is fixed and held on the top fixing face of the hear sink member 7. The drive 6 is fixed and held on a top fixing face of the heat sink member 7. The drive unit 14 is fixed and held on the top fixing face of the holder 6 and the heat sink member 7

The lamp units 3, 5U, 5D, 6, 7, 13U, 13D, 14 are disposed via an optical-axis adjustment mechanism, for example, in a lamp room partitioned by the lamp housing and the lamp lens. In the lamp room, apart from the lamp units 3, 5U, 5D, 6, 7, 13U, 13D, 14, other lamp units such as a fog lamp, a cornering lamp, a clearance lamp, and a turn signal lamp may be disposed.

Figure 10:
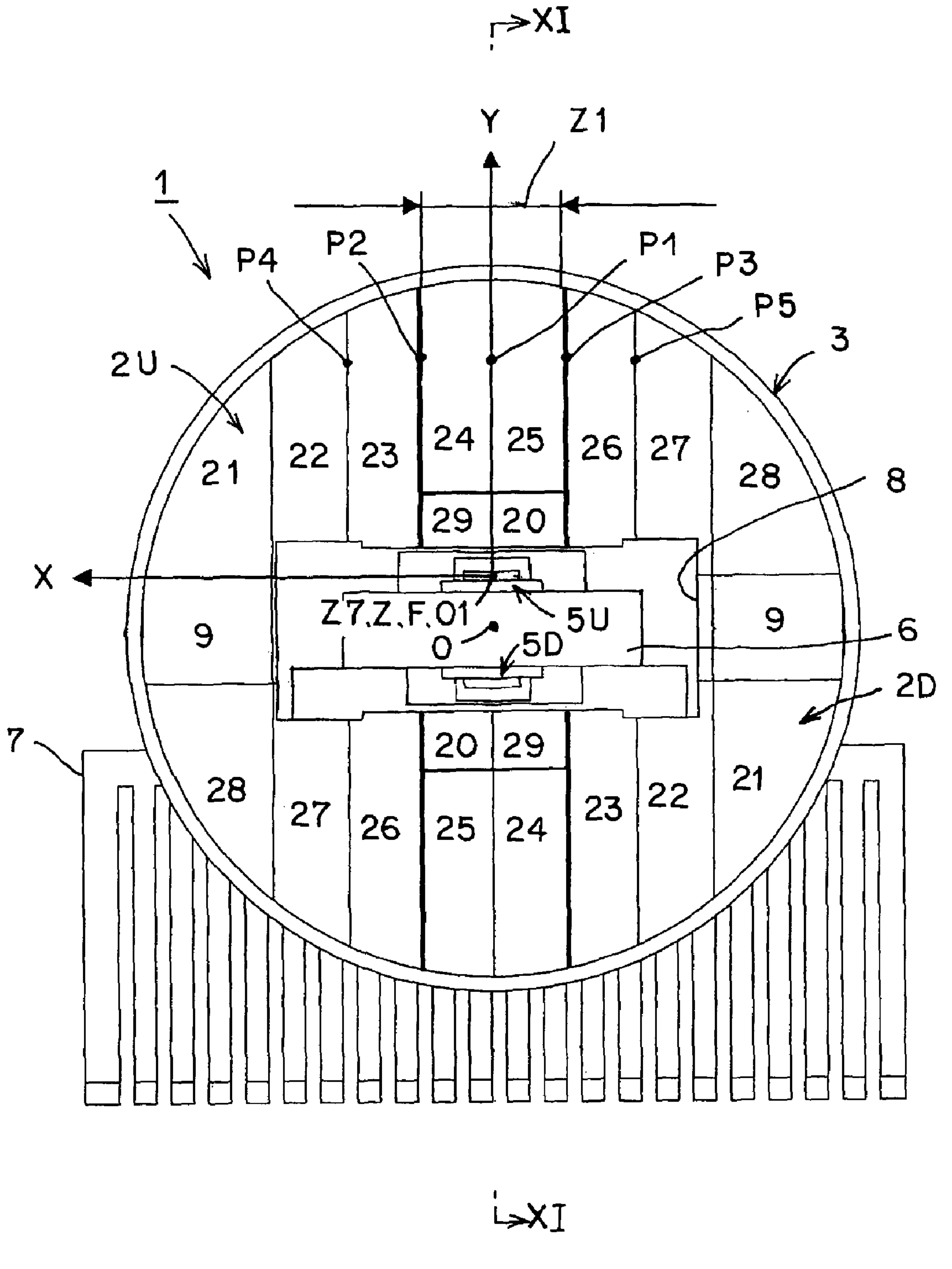
FIG. 10 is a front view showing essential parts without the upside movable reflector, the downside movable reflector, and the drive unit, similarly.

The upside reflecting surface 2U of the fixed reflector 3; the upside reflecting surface 12U of the upside movable reflector 13U; and the upside semiconductor-type light source 5U constitutes an upside unit in which a light emitting face of the light emitting chip 4 is oriented upward in a vertical-axis Y direction. In addition, the downside reflecting surface 2D of the fixed reflector 3; the downside reflecting surface 12D of the downside movable reflector 13D; and the downside semiconductor-type light source 5D constitutes a downside unit in which a light emitting face of the light emitting chip 4 is oriented downward in a vertical-axis Y direction. The upside units 2U, 5U, 12U, 13U and the downside units 2D, 5D, 12D, 13D, as shown in FIG. 10, are disposed in a point-symmetrical state with a point O being a center. A reflecting surface design of the upside reflecting surfaces 2U, 12U and a reflecting surface design of the downside reflecting surfaces 2D, 12D are not merely point-symmetrical (inverted).

The fixed reflector 3 is made up of an optically opaque resin member or the like, for example. The fixed reflector 3 is substantially shaped like a rotational parabola-based face while an axis passing through the point-symmetrical point O is defined as a rotary axis. A front side of the fixed reflector 3 is opened in a substantial circle. The size of an opening at the foreside of the fixed reflector 3 is about 100 mm or less in diameter, and preferably, is about 50 mm or less. On the other hand, a rear side of the fixed reflector 3 is closed. An elongated, substantially rectangular window portion 8 is provided at an intermediate part of the closed portion of the fixed reflector 3. The holder 6 is inserted into the window portion 8 of the fixed reflector 3. The fixed reflector 3 is fixed and held on the holder 6 at the outside (rear side) of the closed portion.

Of the inside (front side) of the closed portion of the fixed reflector 3, the upside reflecting surface 2U and the downside reflecting surface 2D are provided, respectively at the upside and downside of the window portion 8. The upside reflecting surface 2U and the downside reflecting surface 2D made of a parabola-based free curved face (NURBS-curved face) has a reference focal point (pseudo-focal point) F and a reference optical axis (pseudo-optical axis) Z. A reflection-free surface 9 is provided between the upside reflecting surface 2U and the downside reflecting surface 2D and at both the left and right sides of the window portion 8 of the inside (front side) of the closed portion of the fixed reflector 3.

The upside reflecting surface 2U and the downside reflecting surface 2D of the fixed reflector 3 are made up of: a reflecting surface for low beam, forming the light distribution pattern LP for low beam and the light distribution pattern LP1 for dimming low beam; and a first reflecting surface for high beam and a second reflecting surface for high beam, forming the first light distribution pattern HP1 for high beam and the second light distribution pattern HP2 for high beam.

The drive unit 14 is made up of a motor 15, a drive force transmission mechanism 16, and a spring for returning a mobile reflector (not shown). The motor 15 is directly fixed and held on the top fixing face of the heat sink member 7. In this manner, a heat generated at the time of supplying power to the motor 15 can be radiated (dissipated) to the outside at the heat sink member 7. The drive force transmission mechanism 16 is provided between the motor 15 and a respective one of the upside movable reflector 13U and the downside movable reflector 13D The drive unit 14 rotates the upside movable reflector 13U and the downside movable reflector 13D with respect to the holder 6 around the horizontal-axis X between a first location (the location in a state shown in FIGS. 1, 3, 5, and 7) and a second location (the location in a state shown in FIGS. 2, 4, 6, and 8).

The upside movable reflector 13U and the downside movable reflector 13D are made up of an optically opaque resin member, for example. The upside movable reflector 13U and the downside movable reflector 13D, positioned in the second location, are substantially shaped like a rotational parabola-based face while an axis passing through the point-symmetrical point O is defined as a rotary axis. The front sides of the upside movable reflector 13U and the downside movable reflector 13D, positioned in the second location, are opened in a substantial circle. The size of the opening, i.e., an opening area at the front side of the upside movable reflector 13U and the downside movable reflector 13D is smaller than that of the opening, i.e., an opening area at the front side of the fixed reflector 3 (100 mm or less in diameter, and preferably, about 50 mm or less).

Semicircular through holes 17 are provided at central parts of the upside movable reflector 13U and the downside movable reflector 13D, respectively. In addition, rectangular visor portions 18 are integrally provided at intermediate parts of the peripheral parts of the upside movable reflector 13U and the downside movable reflector 13D, respectively. The upside reflecting surface 12U and the downside reflecting surface 12D are provided on faces opposite to the upside semiconductor-type light source 5U of the upside movable reflector 13U and the downside semiconductor-type light source 5D of the downside movable reflector 13D, respectively. The upside reflecting surface 12U and the downside reflecting surface 12D that are made of a parabola-based free curved face (NURBS-curved face) has a reference focal point (pseudo-focal point) F1 and a reference optical axis (pseudo-optical axis) Z7.

The upside reflecting surface 2U of the upside movable reflector 13U and the downside reflecting surface 2D of the downside movable reflector 13D are made of a third reflecting surface for high beam, forming the third light distribution pattern HP3 for high beam.

Figure 12:
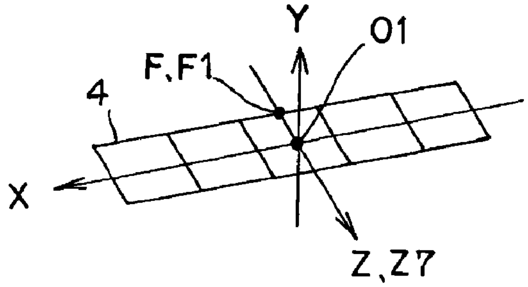
FIG. 12 is an explanatory perspective view showing a relative position relationship between a center of a light emitting chip and a reference focal point of a reflecting surface, similarly.
Figure 13:
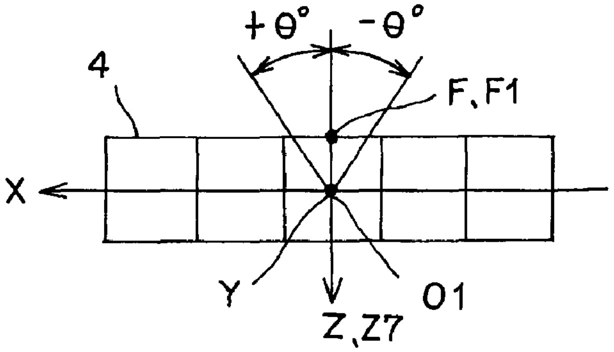
FIG. 13 is an explanatory front view showing a relative position relationship between the center of the light emitting chip and the reference focal point of the reflecting surface, similarly.

The semiconductor-type light sources 5U, 5D are made up of: a board 10: the light emitting chip 4 provided on the board 10; and a sealing resin member 11 shaped like a thin rectangular solid, for sealing the light emitting chip 4. The light emitting chip 4, as shown in FIGS. 12 and 13, arrays five square chips in a horizontal-axis X direction. One rectangular chip may be used.

A center O1 of the light emitting chip 4 is positioned at or near reference focal points F, F1 of the reflecting surfaces 2U, 2D, 12U, 12D, and is positioned on reference optical axes Z, Z7 of the reflecting surfaces 2U, 2D, 12U, 12D. In addition, a light emitting face of the light emitting chip 4 (face opposite to opposite to a face opposed to the substrate 10) is oriented to the vertical-axis Y direction. In other words, the light emitting face of the light emitting chip 4 of the upside semiconductor-type light source 5U is oriented upward in the vertical-axis Y direction. On the other hand, the light emitting face of the light emitting chip 4 of the downside semiconductor-type light source 5D is oriented downward in the vertical-axis Y direction. Further, a long side of the light emitting chip 4 is parallel to a horizontal-axis X which is orthogonal to the reference optical axes Z, Z7 and the vertical axis Y. The horizontal axis X passes through the center O1 of the light emitting chip 4 or its vicinity (between the center O1 of the light emitting chip 4 and a long side at the rear side of the light emitting chip 4, and in this example, on the long side at the rear side of the light emitting chip 4), or alternatively, passes through the reference focal points F, F1 or its vicinity of the reflecting surfaces 2U, 2D, 12U, 12D.

The horizontal axis X, the vertical axis Y, and the reference optical axes Z, Z7 constitute an orthogonal coordinate (X-Y-Z orthogonal coordinate system) with the center O1 of the light emitting chip 4 serving as an origin. In the horizontal axis X, in the case of the upside unit 2U, 5U, 12U, the right side corresponds to a positive direction, and the left side corresponds to a negative direction; in the case of the downside units 2D, 5D, 12D, the left side corresponds to a positive direction and the right side corresponds to a negative direction. In the vertical axis Y, in the case of the upside units 2U, 5U, 12U, the upside corresponds to a positive direction; and the downside corresponds to a negative direction; and in the case of the downside units 2D, 5D, 12D, the downside corresponds to a positive direction, and the upside corresponds to a negative direction. In the reference optical axes Z, Z7, in a respective one of the upside units 2U, 5U and the downside units 2D, 5D, the front side corresponds to a positive direction and the rear side corresponds to a negative direction.

The reflecting surfaces 2U, 2D of the fixed reflector 3 and the reflecting surfaces 12U, 12D of the movable reflectors 13U, 13D are made up of a parabola-based free curved face (NURBS-curved face). The reference focal point F of the reflecting surfaces 2U, 2D of the fixed reflector 3 and the reference focal point F1 of the reflecting surfaces 12U, 12D of the movable reflector 13U, 13D are coincident or substantially coincident with each other; and are positioned on the reference optical axes Z, Z7 and between the center O1 of the light emitting chip 4 and a long side at the rear side of the light emitting chip 4. In this example, these points are positioned at the long side at the rear side of the light emitting chip 4. In addition, the reference focal-point distance of the reflecting surfaces 2U, 2D of the fixed reflector 3 is about 10 mm to 18 mm, and is greater than the reference focal-point distance F1 of the reflecting surfaces 12U, 12D of the movable reflectors 13U, 13D.

The reference optical axis Z of the reflecting surfaces 2U, 2D of the fixed reflector 9 and the reference optical axis Z7 of the reflecting surfaces 12U, 12D of the movable reflectors 13U, 13D when they are positioned in the second location, are coincident or substantially coincident with each other. In addition, the optical axis Z are orthogonal to the horizontal axis X; and further, pass through the center O1 of the light emitting chip 4 or its vicinity. The reference optical axis Z7 of the reflecting surfaces 12U, 12D of the movable reflectors 13U, 13D is forward from the center O1 of the light emitting chip 4 or its vicinity and is upward with respect to the reference optical axis Z of the reflecting surfaces 2U, 2D of the fixed reflector 9.

Figure 1:
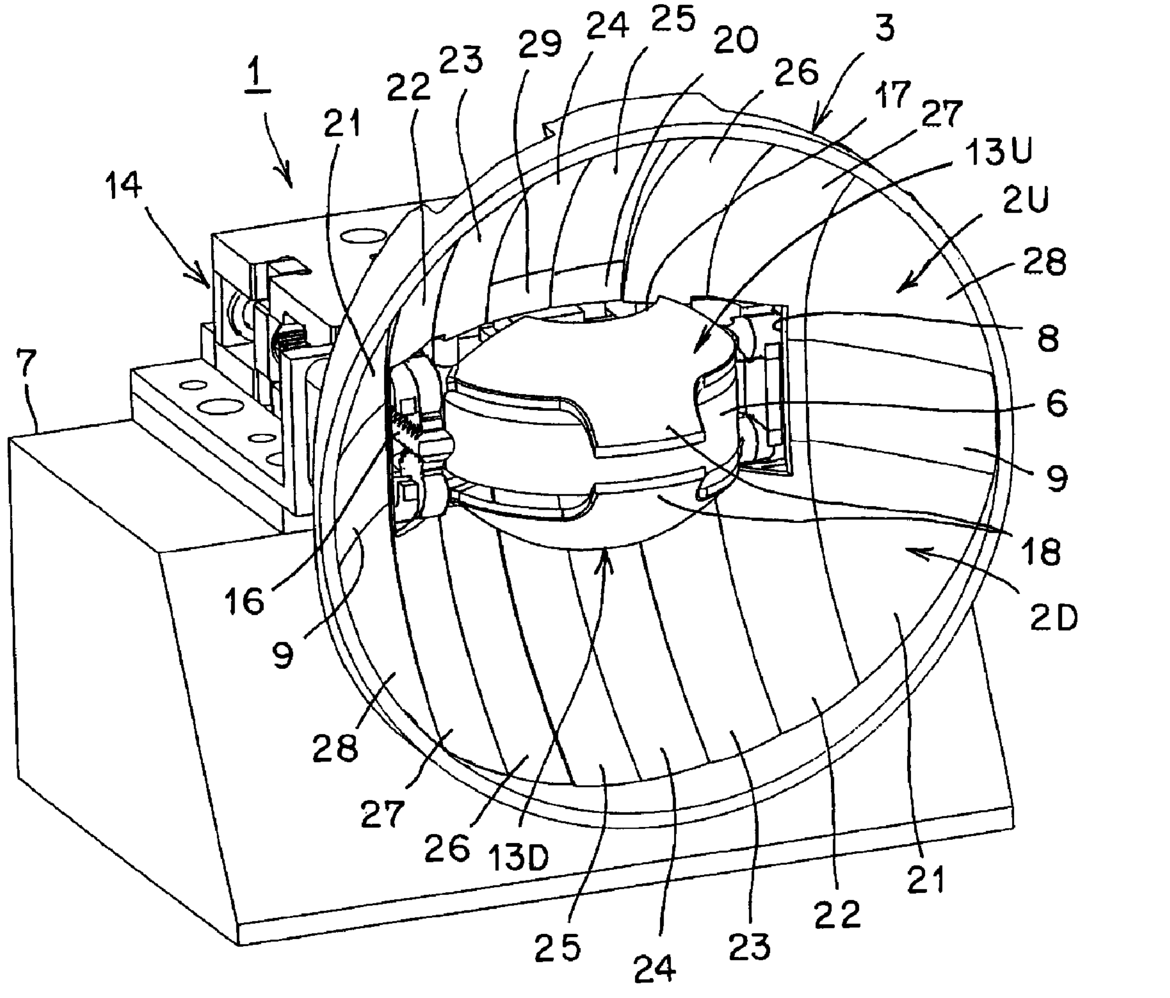
FIG. 1 shows an embodiment of a vehicle headlamp according to the present invention, and is a perspective view of essential parts when an upside movable reflector and a downside movable reflector are positioned in a first location.
Figure 2:
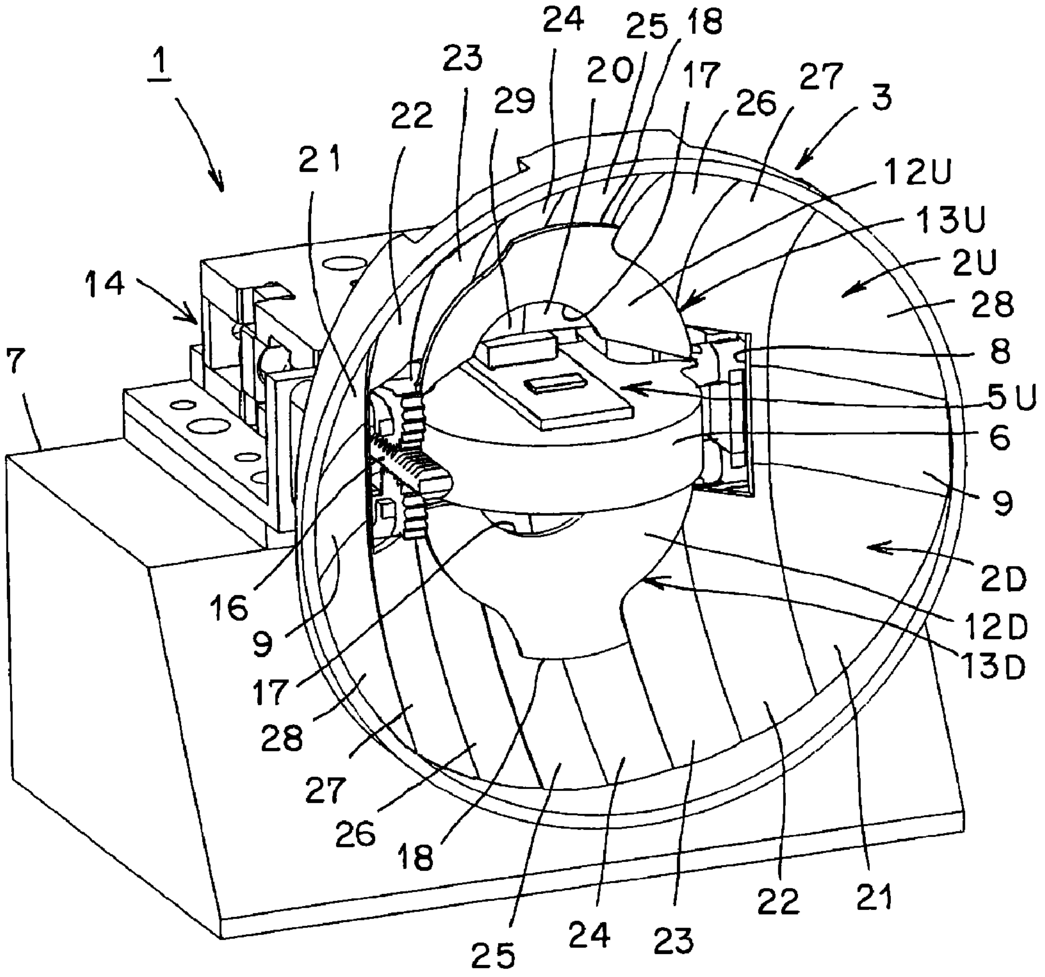
FIG. 2 is a perspective view showing essential parts when the upside movable reflector and the downside movable reflector are positioned in a second location, similarly.
Figure 3:
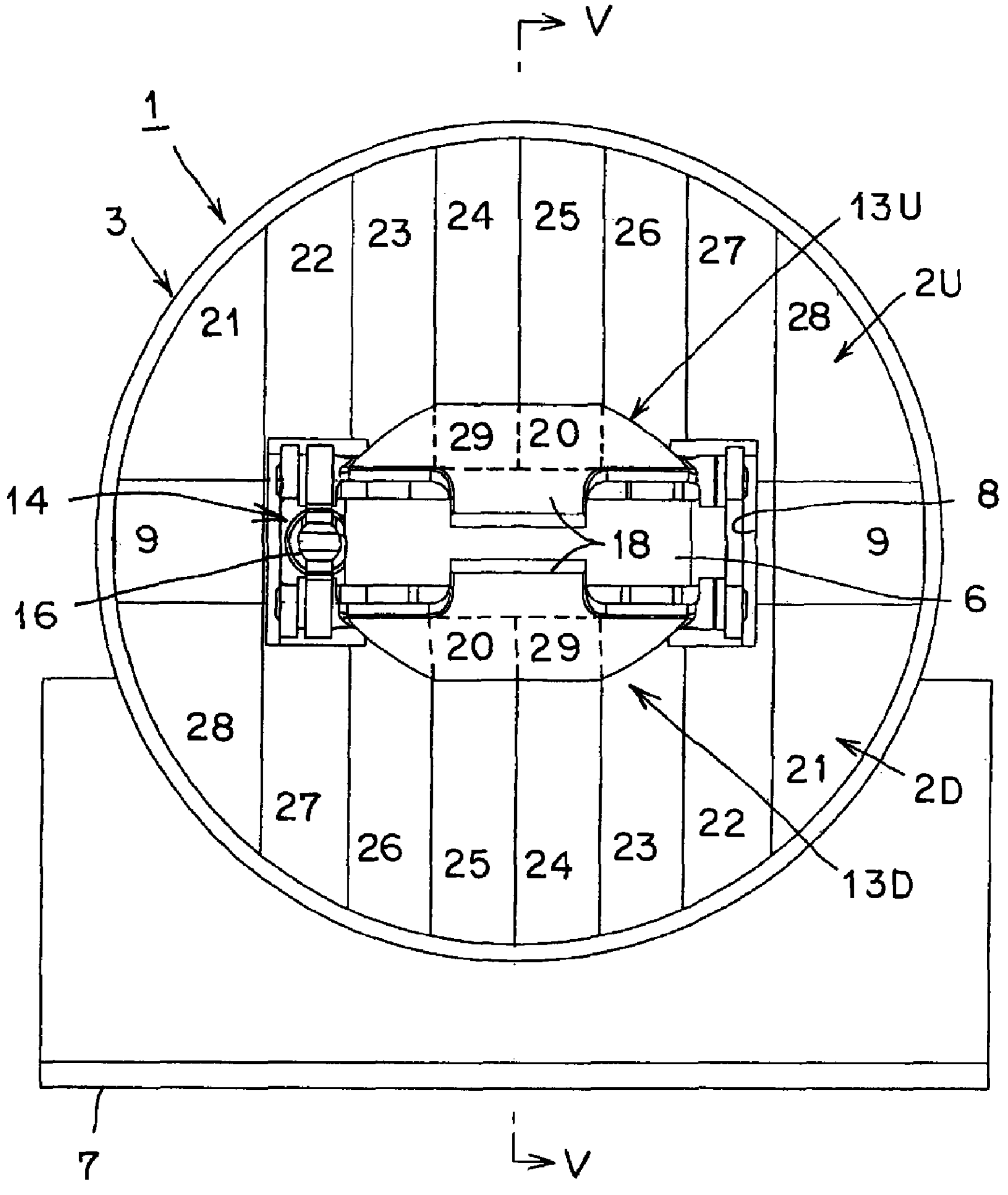
FIG. 3 is a front view showing essential parts when the upside movable reflector and the downside movable reflector are positioned in the first location, similarly.
Figure 4:
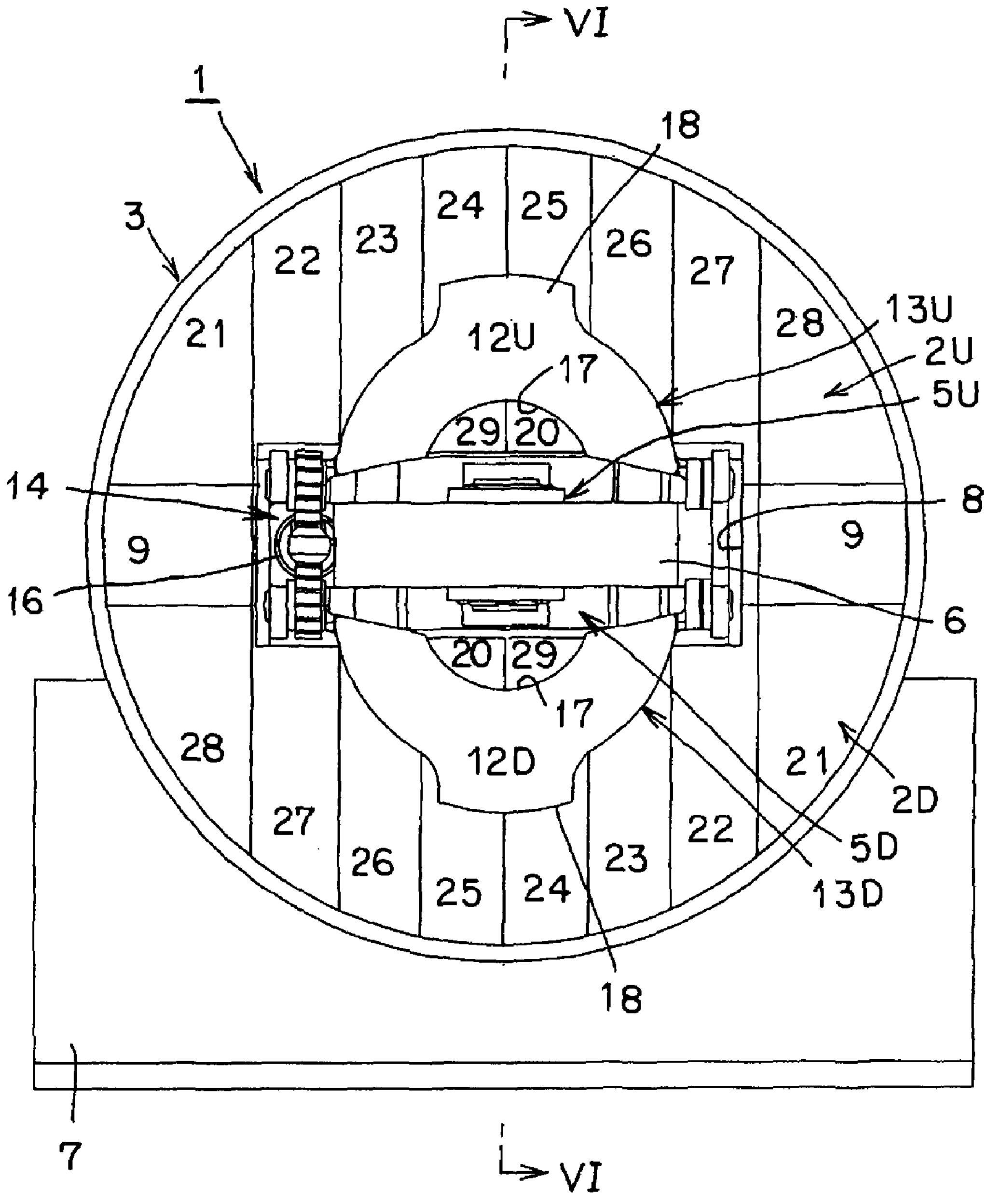
FIG. 4 is a front view showing essential parts when the upside movable reflector and the downside movable reflector are positioned in the second location, similarly.
Figure 5:
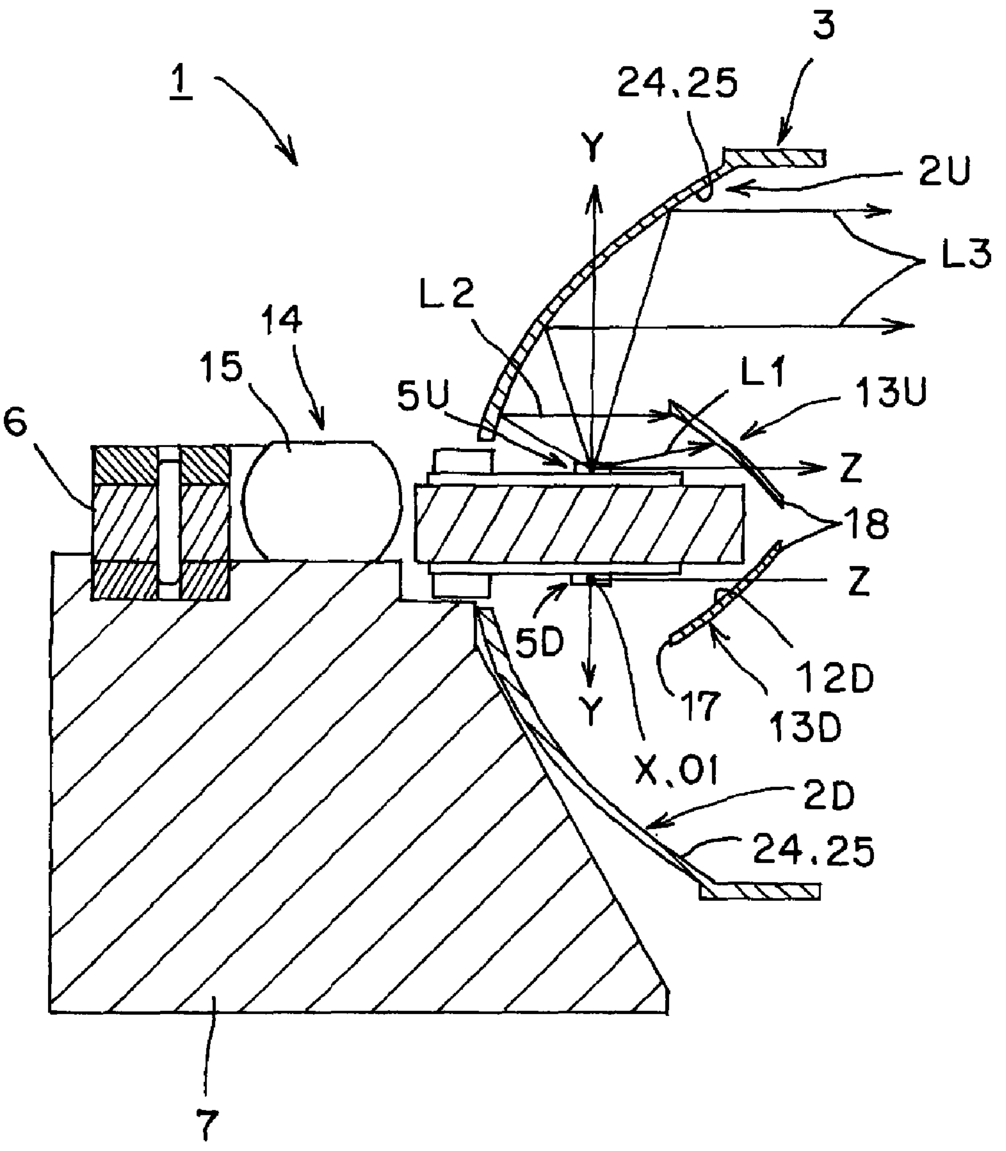
FIG. 5 is a sectional view taken along the line V-V in FIG. 3, the sectional view showing an optical path, similarly.

When the movable reflectors 13U, 13D are positioned in the first location, as shown in FIG. 5, light L1 radiated from the light emitting chip 4 to the first reflecting surface for high beam of the fixed reflector 3 and reflection light L2 reflected on the second reflecting surface for high beam of the fixed reflector 3 are shaded by means of means of the movable reflectors 13U, 13D. As a result, reflection light L3 reflected on the reflecting surface for low beam of the fixed reflector 3 is illuminated toward a forward direction of a vehicle, as the light distribution pattern LP for low beam (light distribution pattern for passing) shown in FIG. 20.

Figure 6:
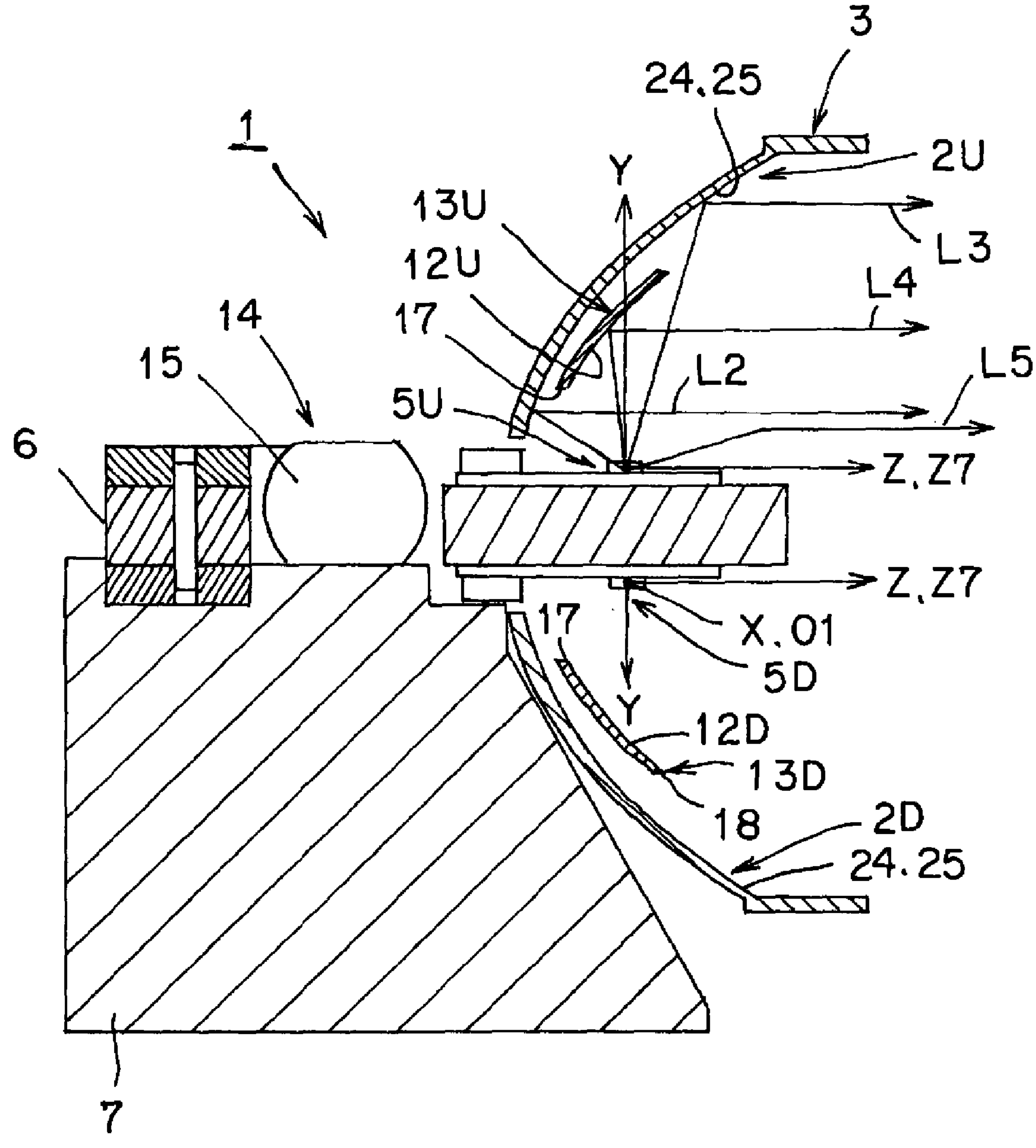
FIG. 6 is a sectional view taken along the line VI-VI in FIG. 4, the sectional view showing an optical path, similarly.
Figure 21:
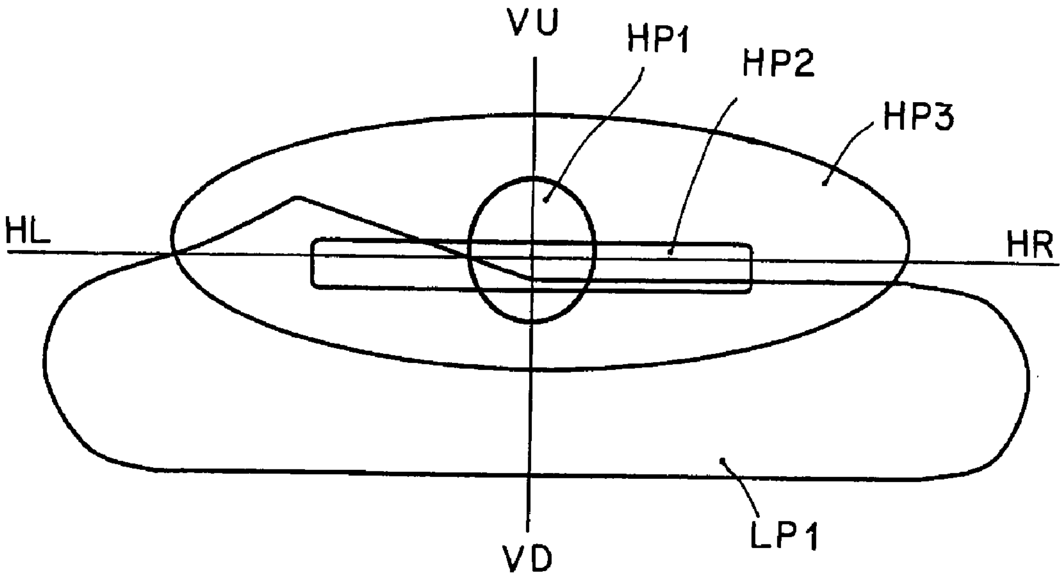
FIG. 21 is an explanatory view showing a light distribution pattern for high beam, similarly.

When the movable reflectors 13U, 13D are positioned in the second location, as shown in FIG. 6, those illuminated toward the forward direction of the vehicle reflection light L4 reflected on the third reflecting surface for high beam (the reflecting surfaces 12U, 12D) are: reflection light L4 reflected on the third reflecting surface of a respective one of the movable reflectors 13U, 13D (the reflecting surfaces 12U, 12D) as the light distribution pattern HP3 for high beam; reflection light beams L5, L2 reflected on the first and second reflecting surfaces for high beam of the fixed reflector 3, shown in FIG. 21 as the first and second light distribution patterns HP1 and HP2 for high beam, shown in FIG. 21; and further, the reflection light L3 reflected on the reflecting surface for low beam of the fixed reflector 3 as the light distribution pattern LP1 for dimming low beam, shown in FIG. 21, respectively. As shown in FIG. 21, a light distribution pattern for high beam (light distribution pattern for cruising) is formed by the first light distribution pattern HP1 for high beam; the second light distribution pattern HP2 for high beam; the light distribution pattern HP3 for high beam; and the light distribution pattern LP1 for dimming low beam, and is illuminated toward the forward direction of the vehicle.

Figure 8:
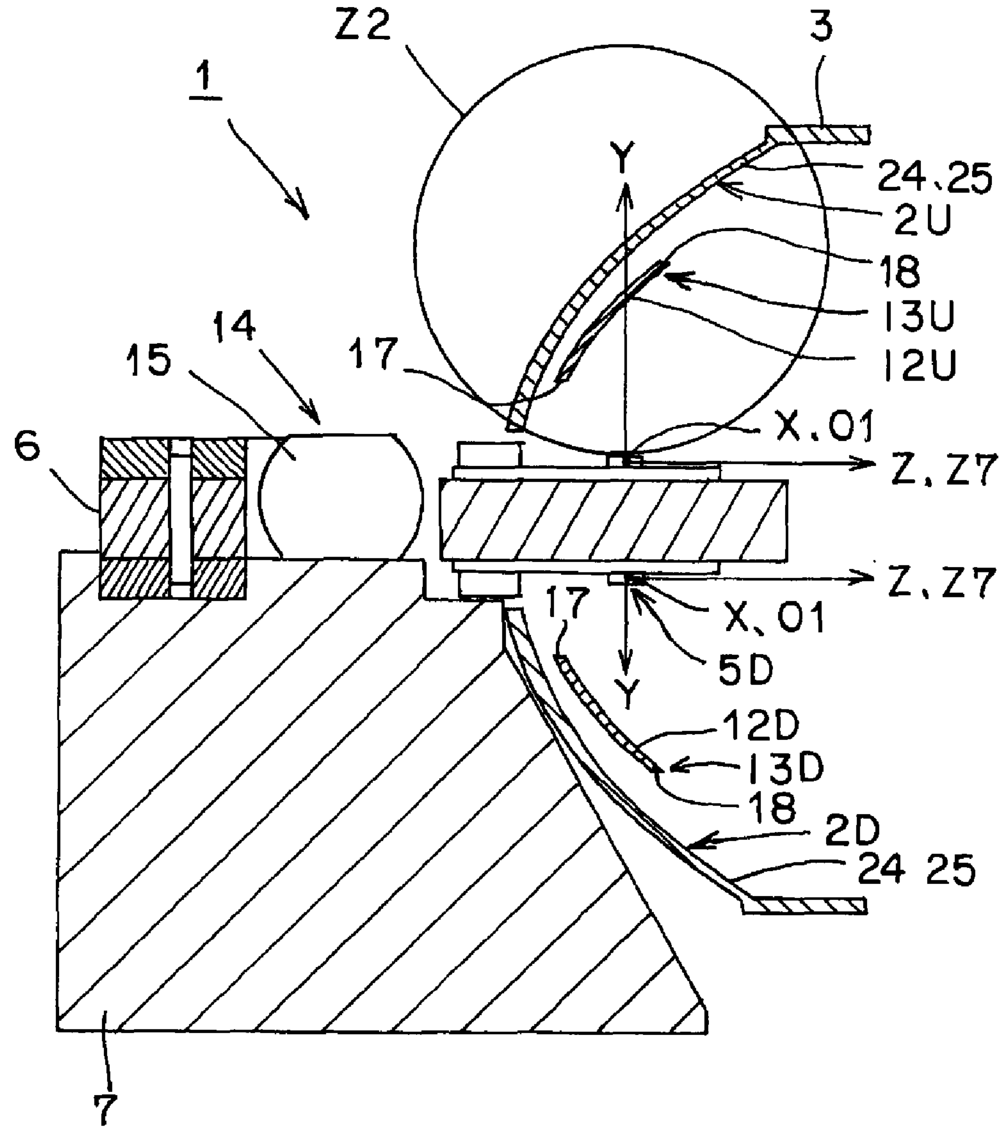
FIG. 8 is a sectional view taken along the line VI-VI in FIG. 4, the sectional view showing an energy distribution of a semiconductor-type light source, similarly.

When the movable reflectors 13U, 13D are positioned in the second location, as shown in FIG. 6, a part of the light radiated from the light emitting chip 4 to the reflecting surface for low beam, of the fixed reflector 3, is shaded by means of means of the movable reflectors 13U, 13D, and is reflected as the reflection light L4 on the third reflecting surface for high beam, of the movable reflectors 13U, 13D. In other words, a part of the light from the light emitting chip 4 is changed from the light distribution pattern LP 1 for dimming low beam to the third light distribution pattern HP3 for high beam. Thus, the light quantity of the light distribution pattern LP1 for dimming low beam, shown in FIG. 21, is smaller that that of the light distribution pattern LP for low beam, shown in FIG. 20. On the other hand, when the movable reflectors 13U, 13D are positioned in the first location, the light from the light emitting chip 4, shaded by means of means of the movable reflectors 13U, 13D, is utilized as the first light distribution pattern HP1 for high beam and the second light distribution pattern HP2 for high beam. At this time, as shown in FIG. 8, the reflecting surfaces 12U, 12D of the movable reflectors 13U, 13D are positioned in a range Z3 of high energy in an energy distribution Z2 of the light emitting chip 4. As a result, on the whole, the light quantity of a respective one of the light distribution patterns HP1, HP2, HP3, LP1 for high beams (light distribution patterns for cruising), shown in FIG. 21, becomes greater than that of the light distribution pattern LP for low beam (light distribution pattern for passing), shown in FIG. 20.

The reflecting surfaces 2U, 2D are divided into eight sections in the vertical-axis Y direction and the central two are made up of segments 21, 22, 23, 24, 25, 26, 27, 28, 29, 20, divided into two sections, respectively, in the horizontal-axis X direction. The second segment 22, the third segment 23, the fourth segment 24, the fifth segment 25, the sixth segment 26, and the seventh segment 27 at the central part and the peripheral part constitute the reflecting surface for low beam. In addition, the first segment 21 and the eighth segment 28 at both ends constitute the first reflecting surface for high beam. Further, the ninth segment 29 and the tenth segment 20 at the central part constitute the second reflecting surface for high beam.

On the reflecting surface for low beam, the fourth segment 24 of the central part constitutes a first reflecting surface. In addition, the fifth segment 25 of the central part constitutes a second reflecting surface. Further, the second segment 22, the third segment 23, the sixth segment 26, and the seventh segment 27 at an end part constitute a third reflecting surface.

Figure 14:
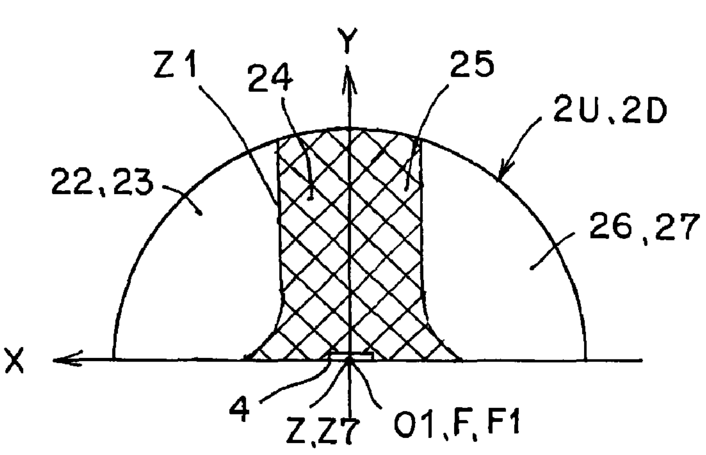
FIG. 14 is an explanatory front view showing a range of providing a first reflecting surface made of a fourth segment and a second reflecting surface made of a fifth segment, similarly.

The fourth segment 24 of the first reflecting surface and the fifth segment 25 of the second reflecting surface, of the central part, are provided in the range Z1 between two longitudinal thick solid lines in FIG. 10, with the range Z1 being a range in which the lattice dashed line in FIG. 14 is drawn, i.e., with the range Z1 being a range in which a longitude angle from the center O1 of the light emitting chip is ±40 degrees (±0 degrees in FIG. 13). The second segment 22, the third segment 23, the sixth segment 26, and the seventh segment 27 of the third reflecting surface of the end art are provided in a white-ground range in FIG. 14 other than the range Z1, i.e., in a range in which the longitude angle from the center O1 of the light emitting chip is ±40 degrees or more.

Figure 15:
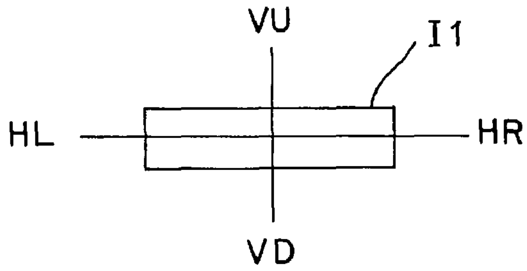
FIG. 15 is an explanatory view showing a reflection image of a light emitting chip, obtained at a point P1 of a reflecting surface, similarly.
Figure 16:
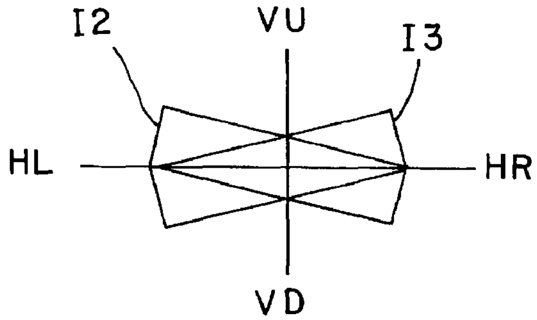
FIG. 16 is an explanatory view showing a reflection image of a light emitting chip, the reflection image being obtained at points P2, P3, of the reflecting surface, similarly.
Figure 17:
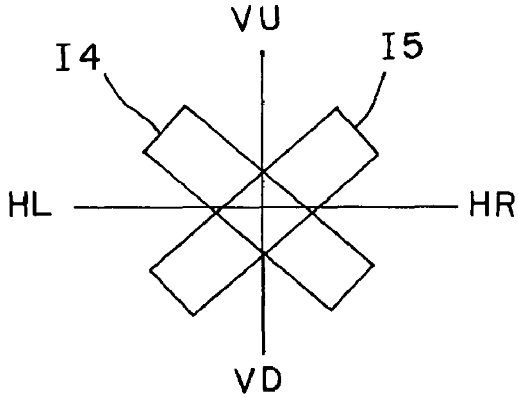
FIG. 17 is an explanatory view showing a reflection image of a light emitting chip, the reflection image being obtained at points P4, P5, of the reflecting surface, similarly.

Hereinafter, a reflection image (screen map) of the light emitting chip 4 with a shape of a planar rectangle, obtained in a respective one of segments 22 to 27 of the reflecting surface for low beam among the reflecting surfaces 2U, 2D will be described referring to FIGS. 15, 16, and 17. In other words, at a boundary P1 between the fourth segment 24 and the fifth segment 25, as shown in FIG. 15, a reflection image I1 of the light emitting chip with a tilt angle of about 0 degrees is obtained with respect to a horizontal line HL-HR of a screen. In addition, at a boundary P2 between the third segment 23 and the fourth segment 24, as shown in FIG. 16, a reflection image I2 of the light emitting chip with a tilt angle of about 20 degrees is obtained with respect to the horizontal line HL-HR of the screen. Further, at a boundary P3 between the fifth segment 25 and the sixth segment 26, as shown in FIG. 16, a reflection image I3 of the light emitting chip 4 with a tilt angle of about 20 degrees is obtained with respect to the screen HL-HR of the screen. Furthermore, at a boundary P4 between the second segment 22 and the third segment 23, as shown in FIG. 17, a reflection image I4 of the light emitting chip 4 with a tilt angle of about 40 degrees is obtained with respect to the horizontal line HL-HR of the screen. Still furthermore, at a boundary P5 between the sixth segment 26 and the seventh segment 27, as shown in FIG. 17, a reflection image I5 of the light emitting chip 4 with a tilt angle of about 40 degrees is obtained with respect to the horizontal line HL-HR of the screen.

As a result, in the fourth segment 24 of the reflecting surface for low beam, reflection images from the reflection image I1 with the tilt angle of about 0 degrees shown in FIG. 15 to the reflection image I2 with the tilt angle of about 20 degrees shown in FIG. 16 are obtained. In addition, in the fifth segment 25 of the reflecting surface for low beam, reflection images from the reflection image I1 with the tilt angle of about 0 degrees shown in FIG. 15 to the reflection image I3 with the tilt angle of about 20 degrees shown in FIG. 16 are obtained. Further, in the third segment 23 of the reflecting surface for low beam, reflection images from the reflecting surface 12 with the tilt angle of about 20 degrees shown in FIG. 16 to the reflection image with the tilt angle of about 40 degrees shown in FIG. 17 are obtained. Furthermore, in the sixth segment of the reflecting surface for low beam, reflection images from the reflection images I3 with the tilt angle of about 20 degrees shown in FIG. 16 to the reflection image I5 with the tilt angle of about 40 degrees shown in FIG. 17 are obtained. Still furthermore, in the second segment 22 and the seventh segment 27 of the reflecting surface for low beam, a reflection image with a tilt angle of about 40 degrees or more is obtained.

Here, the reflection images from the reflection image I1 with the tilt angle of about 0 degree shown in FIG. 15 to the reflection images I2, I3 with the tilt angle of about 20 degrees shown in FIG. 16 are reflection images optimal to form a light distribution including an oblique cutoff line CL1 of the light distribution pattern LP for low beam. In other words, this is because it is easy to take the reflection images from the reflection image I1 with the tilt angle of about 0 degrees to the reflection images I2, I3 with the tilt angle of about 20 degrees along the oblique cutoff line CL1 with the tilt angle of about 15 degrees. On the other hand, the reflection images with the tilt angle of about 20 degrees or more, including the reflection images I4, I5 with the tilt angle of about 40 degrees shown in FIG. 17, are reflection images which is not suitable to form a light distribution including the oblique cutoff line CL1 of the light distribution pattern LP for low beam. In other words, this is because, if the reflection image with the tilt angle of about 20 degrees or more is taken along the oblique cutoff line CL1 with the tilt angle of about 15 degrees, a light distribution becomes thick in a vertical direction, resulting in an excessive short-distance light distribution (i.e., light distribution with lowered long-distance visibility).

Figure 7:
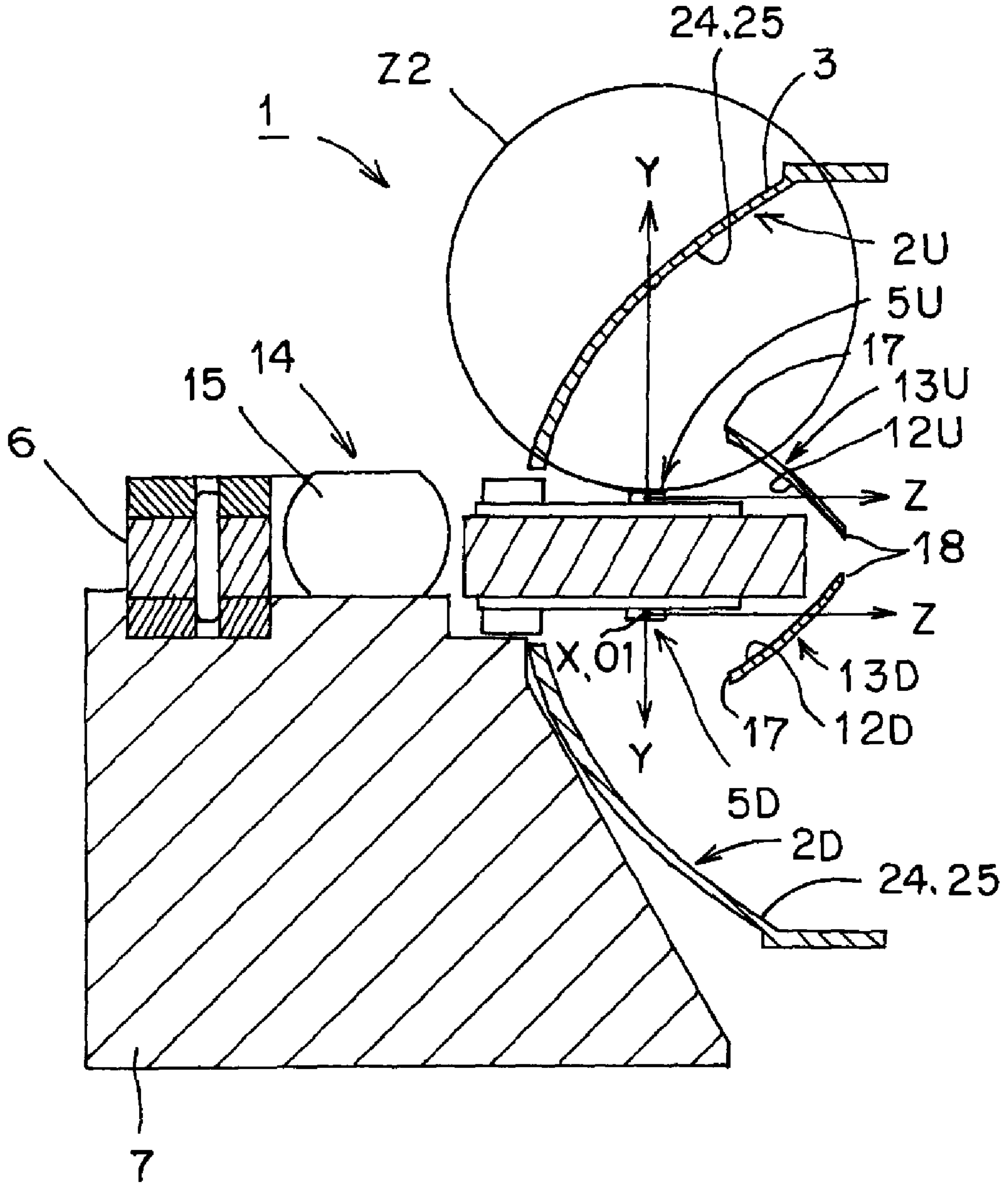
FIG. 7 is a sectional view taken along the line V-V in FIG. 3, the sectional view showing an energy distribution of a semiconductor-type light source, similarly.
Figure 11:
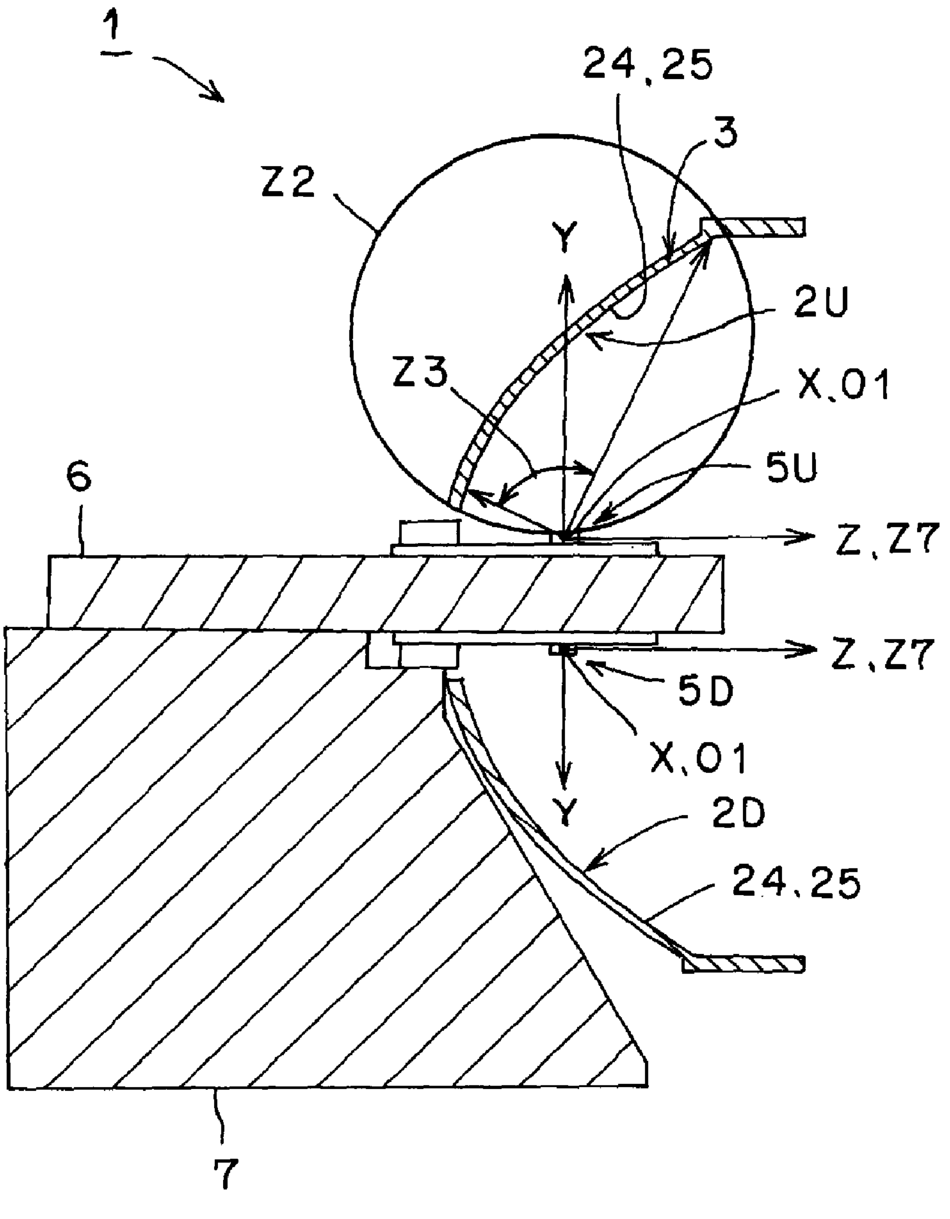
FIG. 11 is a sectional view taken along the line XI-XI in FIG. 10, similarly.

In addition, light distribution in the oblique cutoff line CL1 is responsible for a light distribution with long-distance visibility. Thus, there is a need to form a high luminous intensity zone (high energy zone) for light distribution in the oblique cutoff line CL1. Therefore, the fourth segment 24 of the first reflecting surface and the fifth segment 25 of the second reflecting surface at the central part, as shown in FIG. 11, are included in a range Z3 of high energy in energy distribution (Lambertian) Z2 of the light emitting chip 4. In FIGS. 7, 8, and 11, the energy distribution of the downside semiconductor-type light source 5D is not shown.

From the foregoing, a reflecting surface optimal to form the light distribution in the oblique cutoff line CL1 is determined depending upon a relative relationship between a range in which the reflection images I1, I2 within the tilt angle of 20 degrees, of a parabola-based, free curved reflecting surfaces, are obtained, and the energy distribution (Lambertian) of the semiconductor-type light sources 5U, 5D. As a result, the reflecting surface optimal to form the light distribution in the oblique cutoff line CL1, i.e., the fourth segment 24 and the fifth segment 25 are provided in the range Z1 in which the longitudinal angle is ±40 degrees from the center O1 of the light emitting chip 4, in which the reflection images I1, I2 within an angle (about 20 degrees) determined by adding about 5 degrees to the tilt angle (about 15 degrees) of the oblique cutoff line CL1 are obtained, and in the high-energy range Z3 in the energy distribution (Lambertian) Z2 of the light emitting chip 4.

Figure 20:
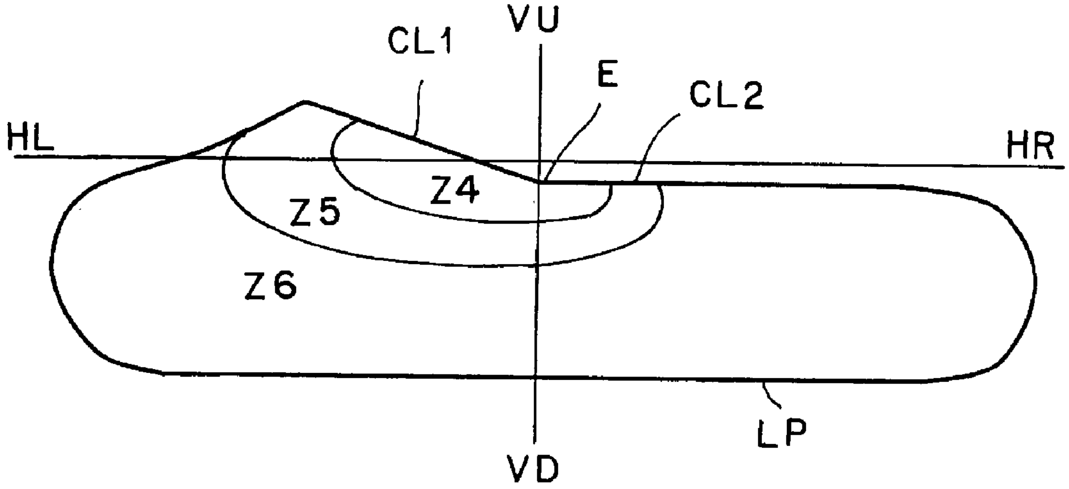
FIG. 20 is an explanatory view showing a light distribution pattern for low beam, having an oblique cutoff line and a horizontal cutoff line, similarly.

The first reflecting surface made of the fourth segment 24, as shown FIGS. 18 and 20, is a reflecting surface made of a free curved face for light-distributing and controlling the reflection images I1, I3 of the light emitting chip 4 in the range Z4 in the light distribution pattern LP for low beam, so that: the reflection images I1, I2 of the light emitting chip 4 do not run out of the oblique cutoff line CL1 and the horizontal cutoff line CL2; and a part of the reflection images I1, I2 of the light emitting chip 4 is substantially in contact with the oblique cutoff line CL1 and the horizontal cutoff line CL2.

In addition, the second reflecting surface made of the fifth segment 5, as shown in FIGS. 19 and 20, is a reflecting surface made of light-distributing and controlling the reflection images I1, I3 of the light emitting chip 4 in the range Z5 containing the zone Z4 in the light distribution pattern LP for low beam, so that: the reflection images I1, I3 of the light emitting chip 4 do not run out of the oblique cutoff line CL1 and the horizontal cutoff line CL2 and a part of the reflection images I1, I3 of the light emitting chip 4 is substantially in contact with the oblique cutoff line CL1 and the horizontal cutoff line CL2; and so that: the density of a group of the reflection images I1, I3 of the light emitting chip 4 becomes lower than that of a group of the reflection images I1, I2 of the light emitting chip 4 according to the first reflecting surface made of the fourth segment 24; and the group of the reflecting surfaces I1, I3 of the light emitting chip 4 contains that of the reflection images I1, I2 of the light emitting chip 4 by the first reflecting surface made of the fourth segment 24. Further, the densities of the reflection images I1 and I2 of the light emitting chip 4 are identical or substantially identical to those of reflection images I1 ad I3.

Further, the third reflecting surface made of the second segment 22, the third segment 23, the sixth segment 26, and the seventh segment 27, as shown in FIG. 20, is a reflecting surface made of a free curved face of light-distributing and controlling reflection images I4, I5 of the light emitting chip 4 in a range Z6 containing ranges Z4, Z5 in the light distribution pattern LP for low beam, so that: the reflection images I4, I5 of the light distribution chip 4 are substantially included in the light distribution pattern LP for low beam; the density of a group of the reflection images I4, I5 of the light emitting chip 4 becomes lower than that of a group of the reflection images I1, I2 of the light emitting chip 4 according to the first reflecting surface made of the fourth segment 24 and a group of the reflection images I1, I3 of the light emitting chip 4 according to the second reflecting surface made of the fifth segment 25; and the group of the reflection surfaces I4, I5 of the light emitting chip 4 contains that of the reflection images I1, I3 of the light emitting chip 4 according to the second reflecting surface made of the fifth segment 25.

The vehicle headlamp 1 of the embodiment is made of the constituent elements as described above, and hereinafter, functions of the constituent elements will be described.

First, an upside movable reflector 13U and a downside movable reflector 13D are positioned in a first position (the location in a state shown in FIGS. 1, 3, 5, and 7). In other words, if power distribution to the motor 15 of the drive unit 14 is interrupted, the upside movable reflector 13U and the downside movable reflector 13D are positioned in the first location due to a spring action and a stopper action which is not shown. At this time, a light emitting chip 4 of a respective one of the upside semiconductor-type light source 5U and the downside semiconductor-type light source 5D is lit to emit light. Afterward, light is radiated from the light emitting chip 4 of the upside semiconductor-type light source 5U and the downside semiconductor-type light source 5D.

A part of the light, i.e., light L1 radiated onto the first reflecting surface for high beam (the first segment 21 and the eighth segment 28) of a fixed reflector 3, as shown in FIG. 5, is shaded by means of means of the upside movable reflector 13U and the downside movable reflector 13D. In addition, a part of the light, i.e., reflection light L2 reflected on the second reflecting surface for high beam (the ninth segment 29 and the tenth segment 20) of the fixed reflector 3, as shown in FIG. 5, is shaded by means of means of the upside movable reflector 13U and the downside movable reflector 13D. Further, the remaining light L3, as shown in FIG. 5, is reflected on the reflecting surface for low beam (the second segment 22, the third segment 23, the fourth segment 24, the fifth segment 25, the sixth segment 26, the seventh segment 27) of the upside reflecting surface 2U and the downside reflecting surface 2D of the fixed reflector 3, as shown in FIG. 5. The reflection light L3 is illuminated toward a forward direction of a vehicle, as a light distribution pattern LP for low beam, shown in FIG. 20. Direct light (not shown) from the light emitting chip 4 of the upside semiconductor-type light source 5U and the downside semiconductor-type light source 5D is shaded by means of means of the upside movable reflector 13U and the downside reflector 13D, in particular by means of a visor portion 18. In FIG. 5, the optical paths in the downside reflecting surface 2D of the fixed reflector 3 and the downside reflecting surface 12D of the downside movable reflector 13D are not shown.

In other words, reflection light from the first reflecting surface made of the fourth segment 24 of the reflecting surfaces 2U, 2D is light-distributed and controlled in the range Z4 in the light distribution pattern LP for low beam so that: the reflection images I1, I2 of the light emitting chip 4 does not run out of the oblique cutoff line CL1 and the horizontal cutoff line CL2; and a part of a respective one of the reflection images I1, I2 of the light emitting chip 4 is substantially in contact with the oblique cutoff line CL1 and the horizontal cutoff line CL2.

In addition, reflection light from the second reflecting surface made of the fifth segment 25 of the reflecting surfaces 2U, 2D is light-distributed and controlled in a range Z5 containing a range Z4 in the light distribution pattern LP for low beam, so that: the reflection images I1, I3 of the light emitting chip 4 do not run out of the oblique cutoff line CL1 and the horizontal cutoff line CL2 and a part of a respective one of the reflection images I1, I3 of the light emitting chip 4 is substantially in contact with the oblique cutoff line CL1 and the horizontal cutoff line CL2; and so that density of the group of the reflection images I1, I3 of the light emitting chip 4 becomes lower than that of the group of the reflection images I1, I2 of the light emitting chip 4 according to the first reflecting surface made of the fourth segment 24 and the group of the reflection images I1, I2 of the light emitting chip 4 contains that of the reflection images I1, I2 of the light emitting chip 4 according to the first reflecting surface made of the fourth segment 24.

Further, the reflection light from the third reflecting surface made of the second segment 22, the third segment 23, the sixth segment 26, and the seventh segment 27 of the reflecting surfaces 2U, 2D is light-distributed and controlled in the range Z6 containing the ranges Z4, Z5 in the light distribution pattern LP for low beam, so that: the reflection images I4, I5 of the light emitting chip 4 are substantially included in the light distribution pattern LP for low beam; the density of the group of the reflection images I4, I5 of the light emitting chip 4 becomes lower than that of the group of the reflection images I1, I2 of the light emitting chip 4 according to the first reflecting surface made of the fourth segment 24 and that of the group of the reflection images I1, I3 of the light emitting chip 4 according to the second reflecting surface made of the fifth segment 25; and the group of the reflection images I4, I5 of the light emitting chip 4 contains that of the reflection images I1, I2 of the light emitting chip 4 according to the first reflecting surface made of the fourth segment 24 and that of the reflection image I1, I3 of the light emitting chip 4 according to the second reflecting surface made of the fifth segment 25.

In the same manner as above, the light distribution pattern LP for low beam, shown in FIG. 20, is illuminated toward the forward direction of the vehicle.

Next, the upside movable reflector 13U and the downside movable reflector 13D are positioned in a second location (the location in a state shown in FIGS. 2, 4, 6, and 8). In other words, if a motor 15 is driven by supplying power to a motor 15 of a drive unit 14, a drive force of the motor 15 is transmitted to the upside movable reflector 13U and the downside movable reflector 13D via a drive force transmission mechanism 16; the upside movable reflector 13U and the downside movable reflector 13D rotate in synchronism from the first location to the second location against a spring force, and are positioned in the second location by means of a stopper action, although not shown. Afterwards, light is radiated from the light emitting chip 4 of the upside semiconductor-type light source 5U and the downside semiconductor-type light source 5D.

A part of the light radiated onto the reflecting surface for low beam (the second segment 22, the third segment 23, the fourth segment 24, the fifth segment 25, the sixth segment 26, the seventh segment 27) of the upside reflecting surface 2U and the downside reflecting surface 2D of the fixed reflector 3, as shown in FIG. 6, is reflected on the third reflecting surface for high beam (reflecting surfaces 12U, 12D) of the movable reflector 13U, 13D, and the reflection light L4 is illuminated toward the forward direction of the vehicle, as the third light distribution pattern HP3 for high beam, shown in FIG. 21. In addition, the light radiated onto the reflecting surface for low beam (the second segment 22, the third segment 23, the fourth segment 24, the fifth segment 25, the sixth segment 26, the seventh segment 27) of the upside reflecting surface 2U and the downside reflecting surface 2D of the fixed reflector 3, and the remaining light having not been incident to the third reflecting surface (reflecting surfaces 12U, 12D) of the movable reflectors 13U, 13D, as shown in FIG. 6, are reflected on the reflecting surface for low beam (the second segment 22, the third segment 23, the fourth segment 24, the fifth segment 25, the sixth segment 26, the seventh segment 27) of the fixed reflector 3; and the reflection light L3 is illuminated toward the forward direction of the vehicle, as the light distribution pattern LP1 for dimming low beam, shown in FIG. 21. Further, when the upside movable reflector 13U and downside movable reflector 13D are positioned in the first location, light L1 radiated onto the first reflecting surface for high beam (the first segment 21 and the eighth segment 28) of the fixed reflector 3, shaded by means of the upside movable reflector 13U and the downside movable reflector 13D, as shown in FIG. 6, is reflected on the first reflecting surface for high beam (the first segment 21 and the eighth segment 28) of the fixed reflector 3, and the reflection light L5 is illuminated toward the forward direction of the vehicle, as the light distribution pattern HP1 for high beam, shown in FIG. 21. Furthermore, when the upside movable reflector 13U and the downside movable reflector 13D are positioned in the first location, reflection light L2 from the second reflecting surface for high beam (the ninth segment 29 and the tenth segment 20) of the fixed reflector 3, shaded by means of the upside movable reflector 13U and the downside movable reflector 13D, as shown in FIG. 6, passes through a through hole 17 of the upside movable reflector 13U and the downside movable reflector 13D positioned in the second location; and is illuminated toward the forward direction of the vehicle, as the second light distribution pattern HP2 for high beam, shown in FIG. 21. In FIG. 6, the optical paths in the downside reflecting surface 2D of the fixed reflector 3 and the downside reflecting surface 12D of the downside movable reflector 13D are not shown.

In the same manner as above, the light distribution patterns HP1, HP2, HP3, LP1 for high beams, shown in FIG. 21 are illuminated toward the forward direction of the vehicle.

The vehicle headlamp 1 of the embodiment is made of the constituent elements and functions, as described above, and hereinafter, advantageous effect(s) thereof will be described.

In the vehicle headlamp 1 of the embodiment, when the upside movable reflector 13U and the downside movable reflector 13D are positioned in the first location, if the light emitting chip 4 of the upside semiconductor-type light source 5U and the downside semiconductor-type light source 5D is lit to emit light, the light radiated from the light emitting chip 4 is reflected on the reflecting surface for low beam (the second segment 22, the third segment 23, the fourth segment 24, the fifth segment 25, the sixth segment 26, the seventh segment 27) of the fixed reflector 3, and the reflection light L3 is illuminated toward the forward direction of the vehicle, as the light distribution pattern LP for low beam. In addition, when the upside movable reflector 13U and the downside movable reflector 13D are positioned in the second location, if the light emitting chip 4 of the upside semiconductor-type light source 5U and the downside semiconductor-type light source 5D is lit to emit light, the light radiated from the light emitting chip 4 is reflected on: the third reflecting surfaces 2U, 2D of the upside movable reflector 13U and the downside movable reflector 13D; and the first reflecting surface (the second segment 21, the eighth segment 28), the second reflecting surface for high beam (the ninth segment 21, the tenth segment 20), and the reflecting surface for low beam (the second segment 22, the third segment 23, the fourth segment 24, the fifth segment 25, the sixth segment 26, the seventh segment 27) of the fixed reflector 3, respectively, and the reflection light beams L2, L3, L4, L5 are illuminated toward the forward direction of the vehicle, respectively, as the light distribution patterns HP1, HP2, HP3, LP1 for high beams.

Moreover, the vehicle headlamp 1 of the embodiment is made up of: the fixed reflector 3; the upside movable reflector 13U and the lower movable reflector 13D; the upside semiconductor-type light source 5U and the downside semiconductor-type light source 5D; and the drive unit 14, so that: the number of components is reduced without a need to provide the second light source unit for a light distribution pattern for high beam, in comparison with the conventional headlamp, this headlamp does not require the second light source unit for a light distribution pattern for high beam, thus enabling reduction of the number of components and downsizing, weight reduction, power saving, and cost reduction accordingly.

In addition, in the vehicle headlamp 1 of the embodiment, when the upside movable reflector 13U and the downside movable reflector 13D are positioned in the first location, a high luminous intensity zone Z4 is light-distributed and controlled near: the oblique cutoff line CL1 of the cruising lane side (left side) of the light distribution pattern LP for low beam; and the horizontal cutoff line SL2 of the opposite lane side (right side) by the first reflecting surface (the fourth segment 24) of the fixed reflector 3, so that long-distance visibility is improved and no stray light is imparted to an oncoming car or pedestrian, making it possible to contribute to traffic safety as the result thereof. Moreover, in the vehicle headlamp 1 of the embodiment, a middle luminous intensity zone Z5, which is light-distributed and controlled on the second reflecting surface (the fifth segment 25) of the fixed reflector 3, encompasses a high luminous intensity zone Z4 near: the oblique cutoff line CL1 of the cruising lane side (left side) of the light distribution pattern LP for low beam, which is light-distributed and controlled on the first reflecting surface (the fourth segment 24); and the horizontal cutoff line CL2 of the opposite lane side (right side), so that: the high luminous intensity zone Z4 near the oblique cutoff line CL1 of the cruising lane side (left side) of the light distribution pattern LP for low beam, which is light-distributed and controlled on the first reflecting surface (the fourth segment 24) and the horizontal cutoff line CL2 of the opposite lane side (right side) are connected to the low luminous intensity zone Z6 of the entire light distribution pattern LP for low beam, which is light-distributed and controlled on the third reflecting surface (the second segment 22, the third segment 23, the sixth segment 26, the seventh segment 27) in the middle luminous intensity zone Z5 near the oblique cutoff line CL1 of the cruising lane side (left side) of the light distribution pattern LP for low beam, which is light-distributed and controlled on the second reflecting surface (the fifth segment 25) ; the horizontal cutoff line CL2 of the opposite lane side (right side); and a smooth change in luminous intensity is obtained. As a result, the vehicle headlamp 1 of the embodiment becomes capable of light-distributing and controlling the light distribution pattern LP for low beam, the light distribution pattern LP having the oblique cutoff line CL1 and the horizontal cutoff line CL2, the pattern being suitable for vehicle use.

Moreover, in the vehicle headlamp 1 of the embodiment, a relationship between the numbers of constituent light sources and optical elements is obtained as that of one set of the upside semiconductor-type light source 5U and the downside semiconductor-type light source 5D to one set of optical elements, i.e., the fixed reflector 3 and the upside and downside movable reflectors 13U and 13D (1:1). As a result, the vehicle headlamp 1 of the embodiment becomes capable of: eliminating an error in combination of distortions at the optical element side; and improving precision of assembling the fixed reflector 3 and the upside and downside movable reflectors 13U and 13D at the optical element side, in comparison with the conventional vehicle headlamp in which a relationship between the number of constituent light sources and optical elements is obtained as that of one light source to three optical elements (a reflector, a shade, and a projecting lens) (1:3) and that of one light source to two optical elements (a reflector and a projecting lens) (1:2).

Further, the vehicle headlamp 1 of the embodiment is provided in a range in which: the fixed reflector 3 is substantially shaped like a rotational parabola face; the size of an opening of the fixed reflector 3 is about 100 mm or less in diameter and is greater than that of a respective one of openings of the upside and downside movable reflectors 13U and 13D when they are positioned in the second location; a reference focal point F of the reflecting surfaces 2U, 2D of the fixed reflector 3 is on a reference optical axis Z and is positioned between the center O1 of the light emitting chip 4 and the long side at the rear side of the light emitting chip 4; a reference focal-point distance of the reflecting surfaces 2U, 2D of the fixed reflector 3 is 10 mm to 18 mm and is greater than that of the upside reflecting surface 12U of the upside reflecting movable reflector 13U and the lower reflecting surface 12D of the lower movable reflector 13D; and the first reflecting surface (the fourth segment 24) and the second reflecting surface (the fifth segment 25) are provided in a range in which a longitude angle is within about 40 degrees from the center O1 of the light emitting chip 4, the range being equivalent to a range in which a reflection image is obtained within an angle (about 20 degrees) of tilt relative to the screen horizontal line HL-HR of the reflection image of the light emitting chip 4, determined by adding about 5 degrees to a tilt angle (about 15 degrees) of the oblique cutoff line CL1, and in a range Z3 of high energy in the energy distribution Z2 of the light emitting chip 4. As a result, the vehicle headlamp 1 of the embodiment becomes capable of reliably achieving both light-distributing and controlling of the light distribution pattern LP for low beam, the pattern being suitable for vehicle use, and downsizing of a lamp unit.

Furthermore, in the vehicle headlamp 1 of the embodiment, the reflecting surfaces 2U, 2D of the fixed reflector 3, the reflecting surfaces 12U, 12D of the movable reflectors 13U, 13D, and the semiconductor-type light source 5U, 5D are disposed so that: upside units 2U, 5U, 12U, 13U, a light emitting face of the light emitting hip 4 being oriented upward in a vertical-axis Y direction; and downside units 2D, 5D, 12D, 13D, a light emitting face of the light emitting chip 4 being oriented downward in the vertical-axis direction, are established in a point-symmetrical state. As a result, even if the fixed reflector 3 and the movable reflectors 13U, 13D are downsized, the luminous intensities of the light distribution patterns LP for low beam and the light distribution patterns HP1, HP2, HP3, LP1 for high beams are sufficiently obtained, so that the vehicle headlamp 1 of the embodiment becomes capable of further reliably achieving both light-distribution and controlling of the light distribution patterns LP for low beams and the light distribution patterns HP1, HP2, HP3, LP1 for high beams, which are suitable for vehicle use, and downsizing of a lamp unit.

Still furthermore, in the vehicle headlamp 1 of the embodiment, a rotational center (horizontal axis X) of the upside movable reflector 13U and the downside movable reflector 13D is positioned at or near the center O1 of the light emitting chip 4, thus facilitating light distribution design or light distribution control of the upside reflecting surface 12U and the downside reflecting surface 12D when the upside movable reflector 13U and the downside movable reflector 13D are positioned in the second location.

The foregoing embodiment described the light distribution pattern LP for low beam. However, in the present invention, it may be a light distribution pattern other than the light distribution pattern LP for low beam, for example, the one having an oblique cutoff line on a cruising lane side and a horizontal cutoff line on an opposite lane side, with an elbow point serving as a boundary, such as a light distribution pattern for expressway or a light distribution pattern for fog lamp.

In addition, the foregoing embodiment described a vehicle headlamp 1 for left-side cruising lane. However, in the present invention, it is applicable to a vehicle headlamp for right-side cruising lane.

Further, the foregoing embodiment described a vehicle headlamp 1 in which the upside unit made of the upside reflecting surfaces 2U, 12U and the upside semiconductor-type light source 5U and the downside unit made of the downside reflecting surfaces 2D, 12D and the downside semiconductor-type light source 5D are disposed in a point-symmetrical state. However, in the present invention, it may be a vehicle headlamp made up of only an upside unit made of an upside reflecting surface 2U, 12U and an upside semiconductor-type light source 5U, or alternatively, a downside unit made of a downside reflecting surface 2D, 12D and a lower semiconductor-type light source 5D.

What is claimed is:

1. A vehicle headlamp for illuminating light toward a forward direction of a vehicle by changing a light distribution pattern for low beam and a light distribution pattern for high beam, said vehicle headlamp comprising:

a fixed reflector having a reflecting surface made of a parabola-based free curved face;

a movable reflector having a reflecting surface made of a parabola-based free curved face;

a semiconductor-type light source having a light emitting chip;

a holder on which the movable reflector is rotatable mounted around a horizontal axis passing through a center of the light emitting chip and vicinity thereof; and a drive unit for rotating the movable reflector around the horizontal axis between a first location and a second location, wherein:

a reference focal point of the reflecting surface of the fixed reflector and a reference focal point of the reflecting surface of the movable reflector are coincident or substantially coincident with each other and are positioned at or near the center of the light emitting chip;

a reference focal light axis of the reflecting surface of the fixed reflector and a reference light axis of the reflecting surface of the movable reflector are coincident or substantially coincident with each other and are orthogonal to the horizontal axis, and further, pass through the center of the light emitting chip or vicinity thereof;

an area of the reflecting surface of the fixed reflector is greater than an area of the reflecting surface of the movable reflector;

a reference focal-point distance of the reflecting surface of the fixed reflector is greater than a reference focal-point distance of the reflecting surface of the movable reflector;

the reflecting surface of the fixed reflector is comprised of a reflecting surface for low beam, forming the light distribution pattern for low beam, and a reflecting surface for high beam, forming the light distribution pattern for high beam;

the reflecting surface of the movable reflector is comprised of a reflecting surface for high beam, forming the light distribution pattern for high beam;

when the movable reflector is positioned in the first location, light radiated from the light emitting chip onto the reflecting surface for high beam, of the fixed reflector, or alternatively, reflection light reflected on the reflecting surface for high beam, of the fixed reflector, is shaded by means of the movable reflector, and reflection light reflected on the reflecting surface for low beam, of the fixed reflector, is illuminated toward the forward direction of the vehicle, as the light distribution pattern for low beam; and when the movable reflector is positioned in the second location, reflection light reflected on the reflecting surface for high beam, of the movable reflector, reflection light reflected on the reflecting surface for high beam, of the fixed reflector, and reflection light reflected on the reflecting surface for low beam, of the fixed reflector, are illuminated toward the forward direction of the vehicle, as the light distribution patterns for high beams, respectively.

2. The vehicle headlamp according to claim 1, wherein:

the light distribution pattern for low beam is a light distribution pattern having an oblique cutoff line on a cruising lane side and a horizontal cutoff line on an opposite lane side, with an elbow point serving as a boundary;

the light emitting chip is shaped like a planar rectangle;

a light emitting face of the light emitting chip is turned to a vertical axis direction being orthogonal to the reference light axis and the horizontal axis;

a long side of the light emitting chip is parallel to the horizontal axis;

the reflecting surface for low beam is comprised of: a first reflecting surface and a second reflecting surface at a central part; and a third reflecting surface at an end part, which are divided in a vertical-axis direction;

the first reflecting surface is a reflecting surface made of a free curved face for light-distributing and controlling a reflection image of the light emitting chip, so that: the reflection image of the light emitting chip does not run out of the oblique cutoff line and the horizontal cutoff line; and a part of the reflection image of the light emitting chip is substantially in contact with the oblique cutoff line and the horizontal cutoff line;

the second reflecting surface is a reflecting surface made of a free curved face for light-distributing and controlling a reflection image of the light emitting chip, so that: the reflection image of the light emitting chip does not run out of the oblique cutoff line and the horizontal cutoff line; and a part of the reflection image of the light emitting chip is substantially in contact with the oblique cutoff line and the horizontal cutoff line; and so that: density of a reflection image group of the light emitting chip becomes lower than density of a reflection image group of the light emitting chip according to the first reflecting surface; and the reflection image group of the light emitting chip contains a reflection image group of the light emitting chip according to the first reflecting surface; and the third reflecting surface is a reflecting surface made of a free curved face for light-distributing and controlling a reflection image of the light emitting chip, so that: the reflection image of the light emitting chip is substantially included in the light distribution pattern; density of the reflection image group of the light emitting chip becomes lower than density of the reflection image group of the light emitting chip according to the first reflecting surface and the second reflecting surface; and the reflection image group of the light emitting chip contains a reflection image group of the light emitting chip according to the first reflecting surface and the second reflecting surface.

3. The vehicle headlamp according to claim 1, wherein:

the fixed reflector is substantially shaped like a rotational parabola face;

a size of an opening of the fixed reflector is about 100 mm or less in diameter and is greater than a size of an opening of the movable reflector when the movable reflector is positioned in the second location;

a reference focal point of the reflecting surface of the fixed reflector is on the reference optical axis and is positioned between a center of the light emitting chip and a long side at a rear side of the light emitting chip;

a reference focal-point distance of the reflecting surface of the fixed reflector is about 10 mm to 18 mm and is greater than a reference fiscal-point distance of the reflecting surface of the movable reflector; and the first reflecting surface and the second reflecting surface are provided in a range in which a longitudinal angle is within ±40 degrees from a center O1 of the light emitting chip, the range being equivalent to a range in which reflection images are obtained within an angle determined by adding about 5 degrees to a tilt angle of the oblique cutoff line against a screen horizontal line of a reflecting image of the light emitting chip, and in a range of high-energy in the energy distribution of the light emitting chip.

4. The vehicle headlamp according to claim 1, wherein:

the reflecting surface of the fixed reflector, the reflecting surface of the movable reflector, and the semiconductor-type light source are disposed so that an upside unit, a light emitting face of the light emitting chip being oriented upward in a vertical-axis direction, and a downside unit, a light emitting face of the light emitting chip being oriented downward in a vertical-axis direction, are established in a point-symmetrical state.

5. A vehicle headlamp, comprising:

(i) a semiconductor-type light source for illuminating light;

(ii) a first reflector made of a parabola-based curved face, the first reflector having a plurality of reflecting surfaces including a first reflecting surface for light distribution pattern and a second reflecting surface for light distribution pattern, for reflecting light radiated from the semiconductor-type light source, as reflection light, so as to illuminate the reflected light to a forward direction of a vehicle; and (iii) a second reflector which is movable to a predetermined location, the second reflector having the second reflecting surface for light distribution pattern, for interrupting reflection light according to the reflecting surface of the first reflector, wherein:

the second reflector is adapted to be movable between:

a first location in which the second reflecting surface for light distribution pattern of the second reflector is disposed in opposite to the second reflecting surface for light distribution pattern of the first reflector; and a second location in which the second reflecting surface for light distribution pattern of the second reflector is disposed in front of the first reflecting surface for light distribution pattern of the first reflector;

when the second reflector is disposed in the first location, reflection light reflected on the second reflecting surface for light distribution of the first reflector is shaded by means of the second reflecting surface for light distribution pattern of the second reflector and reflection light reflected on the first reflecting surface for light distribution pattern of the first reflector is illuminated toward the forward direction of the vehicle, as a first light distribution pattern; and when the second reflector is disposed in the second location, reflection light reflected on the first reflecting surface for light distribution pattern of the first reflector is shaded by means of the second reflecting surface for light distribution pattern, of the second reflector; and a respective one of reflection light beams reflected on the second reflecting surface for light distribution pattern, of the first reflector, and on the second reflecting surface for light distribution pattern, of the second reflector, is illuminated toward the forward direction of the vehicle, as a second light distribution pattern.

6. The vehicle headlamp according to claim 5, wherein:

the second reflector has a through hole through which reflection light according to the second reflecting surface for light distribution pattern of the first reflector is passed toward the forward direction of the vehicle in the second location.

7. The vehicle headlamp according to claim 5, wherein:

the second reflector has a visor portion which is provided at a peripheral edge of the second reflector so as to interrupt direct light from the semiconductor-type light source in the first location.

8. The vehicle headlamp according to claim 5, wherein:

the second reflecting surface for light distribution pattern, of the second reflector, is disposed opposite to a part of the first reflecting surface for light distribution pattern, of the first reflector, in the second location;

when the second reflector is disposed in the second location, a part of reflection light reflected on the first reflecting surface for light distribution pattern, of the first reflector, is shaded by means of the second reflecting surface for light distribution pattern, of the second reflector;

a respective one of reflection light beams reflected on the second reflecting surface for light distribution pattern, of the first reflector, the second reflecting surface for light distribution pattern, of the second reflector, and apart other than said part of the first reflecting surface for light distribution pattern, of the first reflector, is illuminated toward the forward direction of the vehicle, as a second light distribution pattern.

9. The vehicle headlamp according to claim 5, further comprising:

a holder for fixing and holding the semiconductor-type light source and the first reflector so that light radiated from a light emitting lace of the semiconductor-type light source, as reflection light, is illuminated in a vertical-axis direction by means of the first reflector, the holder rotatably mounting the second reflector between the first location and the second location.

10. The vehicle headlamp according to claim 5, wherein:

the first reflecting surface for light distribution pattern, of the first reflector, includes:

a first reflecting surface and a second reflecting surface, which are adjacent to each other at a center of the first reflector, and are arranged in a range of high energy in an energy distribution of the semiconductor-type light source; and a third reflecting surface which is arranged at a respective one of ends of the first reflector so as to sandwich the first reflecting surface and the second reflecting surface therebetween, and are arranged in a range of low energy in an energy distribution of the semiconductor-type light source; and the second reflecting surface for light distribution pattern, of the first reflector, is provided at a part of the first reflecting surface and the second reflecting surface of the first reflecting surface for light distribution pattern, of the first reflector.

11. The vehicle headlamp according to claim 10, wherein:

the first reflecting surface and the second reflecting surface of the first reflecting surface for light distribution pattern, of the first reflector, is provided in a range in which a reflection image of the semiconductor-type light source is obtained within a longitudinal angle of about 40 degrees from a center in a vertical-axis direction of the light emitting face.

12. The vehicle headlamp according to claim 5, wherein:

the first reflecting surface for light distribution pattern of the first reflector, is reflecting surface forming reflection light of a low-beam light distribution pattern for passing; and the second reflecting surface for light distribution pattern, of the first reflector and the second reflector, is a reflecting surface forming reflection light of a high-beam light distribution pattern for cruising.

13. A vehicle headlamp, comprising:

(i) a semiconductor-type light source for illuminating light;

(ii) a first reflector made of a parabola-based curved face, the first reflector having a plurality of reflecting surfaces including a first reflecting surface for light distribution pattern and a second reflecting surface for light distribution pattern, for reflecting light radiated from the semiconductor-type light source, as reflection light, so as to illuminate the reflected light toward a forward direction of a vehicle; and (iii) a second reflector which is movable to a predetermined location, the second reflector having the second reflecting surface for light distribution pattern, for interrupting reflection light according to the reflecting surface of the first reflector, wherein:

the second reflector is adapted to be movable between:

a first location in which the second reflecting surface for light distribution pattern of the second reflector is disposed in opposite to the second reflecting surface for light distribution pattern of the first reflector; and a second location in which the second reflecting surface for light distribution pattern of the second reflector is disposed in front of the first reflecting surface for light distribution pattern of the first reflector;

when the second reflector is disposed in the first location, reflection light reflected on the second reflecting surface for light distribution pattern of the first reflector is shaded by means of the second reflecting surface for light distribution pattern of the second reflector and reflection light reflected on the first reflecting surface for light distribution pattern of the first reflector is illuminated toward the forward direction of the vehicle, as a first light distribution pattern; and when the second reflector is disposed in the second location, a part of reflection light reflected on the first reflecting surface for light distribution pattern of the first reflector is shaded by means of the second reflecting surface for light distribution pattern, of the second reflector; and a respective one of reflection light beams reflected on the second reflecting surface for light distribution pattern, of the first reflector, the second reflecting surface for light distribution pattern, of the second reflector, and apart other than said part of the first reflecting surface for light distribution pattern, of the first reflector, is illuminated toward the forward direction of the vehicle, as a second light distribution pattern.

14. The vehicle headlamp according to the claim 13, wherein:

the first reflecting surface and the second reflecting surface of the first reflecting surface for light distribution pattern, of the first reflector, are provided in a range in which a reflection image of the semiconductor-type light source is obtained within a longitudinal angle of ±40 degrees from a center of a vertical-axis direction of the light emitting face of the semiconductor-type light source.

15. The vehicle headlamp according to claim 13, further comprising:

a holder for fixing and holding the semiconductor light source and the first reflector so that light radiated in a vertical-axis direction from the light emitting face of the semiconductor-type light source, as reflection light, is illuminated toward a forward direction of a vehicle, by means of the first reflector, the holder rotatably mounting the second reflector between the first location and the second location.

16. The vehicle headlamp according to claim 13, wherein:

the second reflector has a through hole through which reflection light according to the second reflecting surface for light distribution pattern, of the first reflector, is passed toward the forward direction of the vehicle in the second location.

17. The vehicle headlamp according to claim 13, wherein:

the second reflector has a visor portion provided at a peripheral edge of the second reflector so as to interrupt direct light from the semiconductor-type light source in the first location.

* * * * *